US012076731B2

(12) United States Patent
Pieper et al.

(10) Patent No.: US 12,076,731 B2
(45) Date of Patent: Sep. 3, 2024

(54) CENTRIFUGES AND CENTRIFUGE INSERTS FOR FLUID PROCESSING SYSTEMS

(71) Applicant: Fenwal, Inc., Lake Zurich, IL (US)

(72) Inventors: Gregory G. Pieper, Waukegan, IL (US); Salvatore Manzella, Jr., Barrington, IL (US); Brian C. Case, Lake Villa, IL (US); Steven R Katz, Deerfield, IL (US); Kyungyoon Min, Kildeer, IL (US)

(73) Assignee: Fenwal, Inc., Lake Zurich, IL (US)

( * ) Notice: Subject to any disclaimer, the term of this patent is extended or adjusted under 35 U.S.C. 154(b) by 231 days.

(21) Appl. No.: 17/336,394

(22) Filed: Jun. 2, 2021

(65) Prior Publication Data

US 2021/0291200 A1 Sep. 23, 2021

Related U.S. Application Data

(60) Continuation of application No. 16/790,815, filed on Feb. 14, 2020, now Pat. No. 11,052,408, which is a continuation of application No. 15/943,877, filed on Apr. 3, 2018, now Pat. No. 10,596,579, which is a continuation of application No. 15/062,323, filed on Mar. 7, 2016, now Pat. No. 9,968,946, which is a (Continued)

(51) Int. Cl.
*B04B 7/08* (2006.01)
*B04B 5/04* (2006.01)

(52) U.S. Cl.
CPC .............. *B04B 7/08* (2013.01); *B04B 5/0442* (2013.01); *B04B 2005/045* (2013.01)

(58) Field of Classification Search
CPC .... B04B 1/04; B04B 1/06; B04B 1/08; B04B 5/0442; B04B 7/08; B04B 7/12; B04B 2005/045; B04B 2005/0471; B04B 2005/0492
See application file for complete search history.

(56) References Cited

U.S. PATENT DOCUMENTS 4,010,894 A 3/1977 Kellogg et al.
4,120,449 A 10/1978 Brown et al.

(Continued)

FOREIGN PATENT DOCUMENTS

WO WO 9633023 A1 10/1996
WO WO 9850163 A1 11/1998

(Continued)

*Primary Examiner* — Timothy C Cleveland
(74) *Attorney, Agent, or Firm* — Cook Alex Ltd.

(57) ABSTRACT

Fluid separation chambers are provided for rotation about an axis in a fluid processing system. The fluid separation chamber may be provided with first and second stages, with the first and second stages being positioned at different axial locations. In another embodiment, at least one of the stages may be provided with a non-uniform outer diameter about the rotational axis, which may define a generally spiral-shaped profile or a different profile for fractionating a fluid or fluid component. One or more of the stages may also have a varying outer diameter along the axis. The profile of the chamber may be provided by the chamber itself (in the case of rigid chambers) or by an associated fixture or centrifuge apparatus (in the case of flexible chambers).

16 Claims, 15 Drawing Sheets

Related U.S. Application Data division of application No. 13/750,232, filed on Jan. 25, 2013, now Pat. No. 9,327,296.

(60) Provisional application No. 61/720,518, filed on Oct. 31, 2012, provisional application No. 61/591,655, filed on Jan. 27, 2012.

(56) References Cited

U.S. PATENT DOCUMENTS

| | | | |
|---|---|---|---|
| 4,386,730 A | | 6/1983 | Mulzet |
| 4,387,848 A | | 6/1983 | Melroy |
| 4,419,089 A | | 12/1983 | Kolobow et al. |
| 4,543,083 A | | 9/1985 | Bounds |
| 4,647,279 A | | 3/1987 | Mulzet et al. |
| 4,708,712 A | | 11/1987 | Mulzet |
| 4,851,126 A | | 7/1989 | Jones |
| 4,934,995 A | | 6/1990 | Cullis |
| 5,217,426 A | | 6/1993 | Bacehowski et al. |
| 5,360,542 A | * | 11/1994 | Williamson, IV ........................... B01D 21/2405 210/512.1 |
| 5,370,802 A | | 12/1994 | Brown |
| 5,571,068 A | * | 11/1996 | Bacehowski .......... C07K 16/30 494/45 |
| 5,649,903 A | | 7/1997 | Deniega |
| 5,674,173 A | | 10/1997 | Hlavinka |
| 5,722,926 A | | 3/1998 | Hlavinka |
| 5,868,696 A | | 2/1999 | Glesler |
| 5,904,645 A | * | 5/1999 | Hlavinka .............. B04B 5/0442 494/45 |
| 5,906,570 A | | 5/1999 | Langley |
| 5,913,768 A | | 6/1999 | Langley |
| 5,939,319 A | | 8/1999 | Hlavinka |
| 5,951,877 A | | 9/1999 | Langley et al. |
| 5,993,370 A | | 11/1999 | Brown |
| 5,996,634 A | | 12/1999 | Dennehey |
| 6,022,306 A | | 2/2000 | Dumont et al. |
| 6,051,146 A | | 4/2000 | Green |
| 6,053,856 A | | 4/2000 | Hlavinka |
| 6,071,422 A | | 6/2000 | Hlavinka |
| 6,248,053 B1 | | 6/2001 | Ehnstrom et al. |
| 6,277,060 B1 | | 8/2001 | Neumann |
| 6,334,842 B1 | | 1/2002 | Sorkin |
| 6,348,156 B1 | | 2/2002 | Vishnoi et al. |
| 6,582,349 B1 | | 6/2003 | Cantu |
| 6,875,191 B2 | | 4/2005 | Smith |
| 7,001,321 B1 | * | 2/2006 | Brown .................. B04B 5/0442 494/44 |
| 7,011,761 B2 | | 3/2006 | Muller |
| 7,087,177 B2 | | 8/2006 | Min |
| 7,297,272 B2 | | 11/2007 | Min |
| 7,354,415 B2 | | 4/2008 | Bainbridge et al. |
| 7,438,679 B2 | | 4/2008 | Hlavinka et al. |
| 7,442,178 B2 | | 10/2008 | Chammas |
| 7,452,322 B2 | | 11/2008 | Headley et al. |
| 7,470,371 B2 | | 12/2008 | Dorian et al. |
| 7,473,216 B2 | | 1/2009 | Lolachi et al. |
| 7,497,944 B2 | | 3/2009 | Hogberg et al. |
| 7,549,956 B2 | | 6/2009 | Hlavinka et al. |
| 7,582,049 B2 | | 9/2009 | Hlavinka et al. |
| 7,588,692 B2 | | 9/2009 | Anlwiler et al. |
| 7,601,268 B2 | | 10/2009 | Ragusa |
| 7,648,452 B2 | | 1/2010 | Holmes et al. |
| 7,648,639 B2 | | 1/2010 | Holmes et al. |
| 7,674,221 B2 | | 3/2010 | Hudock et al. |
| 7,708,152 B2 | | 5/2010 | Dorian et al. |
| 7,708,710 B2 | | 5/2010 | Min |
| 7,766,809 B2 | | 8/2010 | Dolecek et al. |
| 7,811,463 B2 | | 10/2010 | Dolecek et al. |
| 7,819,793 B2 | | 10/2010 | Lindell et al. |
| 7,824,559 B2 | | 11/2010 | Dorian et al. |
| 7,833,185 B2 | | 11/2010 | Felt et al. |
| 7,837,884 B2 | | 11/2010 | Dorian et al. |
| 7,857,744 B2 | | 12/2010 | Langley et al. |
| 7,866,485 B2 | | 1/2011 | Dorian et al. |
| 7,867,159 B2 | | 1/2011 | Dolecek et al. |
| 7,981,019 B2 | | 3/2011 | Holmes et al. |
| 7,934,603 B2 | | 5/2011 | Eaton et al. |
| 7,943,916 B2 | | 5/2011 | Carter et al. |
| 7,963,901 B2 | | 6/2011 | Langley et al. |
| 7,976,796 B1 | | 7/2011 | Smith et al. |
| 7,987,995 B2 | | 8/2011 | Dorian et al. |
| 8,012,077 B2 | | 9/2011 | Hoeppner |
| 8,057,377 B2 | | 11/2011 | Holmes et al. |
| 8,075,468 B2 | | 12/2011 | Min |
| 2003/0066807 A1 | | 4/2003 | Suzuki |
| 2003/0166445 A1 | | 9/2003 | Rochat |
| 2003/0173274 A1 | | 9/2003 | Corbin, III et al. |
| 2004/0065626 A1 | | 4/2004 | Woo |
| 2006/0104863 A1 | | 5/2006 | Bell |
| 2008/0171646 A1 | | 1/2008 | Dolecek et al. |
| 2008/0147240 A1 | | 6/2008 | Hudock et al. |
| 2008/0149564 A1 | | 6/2008 | Holmes |
| 2008/0153686 A1 | | 6/2008 | Rochat |
| 2008/0248938 A1 | | 10/2008 | Chammas |
| 2008/0257836 A1 | | 10/2008 | Laughlin |
| 2008/0283473 A1 | | 11/2008 | Holmes et al. |
| 2009/0259162 A1 | | 10/2009 | Ohashi et al. |
| 2009/0272701 A1 | | 11/2009 | Holmes et al. |
| 2009/0286221 A1 | | 11/2009 | Klip et al. |
| 2009/0298665 A1 | | 12/2009 | Dolecek et al. |
| 2009/0317305 A1 | | 12/2009 | Hudock et al. |
| 2010/0026986 A1 | | 2/2010 | Stanton et al. |
| 2010/0042037 A1 | | 2/2010 | Fall et al. |
| 2010/0081196 A1 | | 4/2010 | Fall et al. |
| 2010/0210441 A1 | | 8/2010 | Dolecek |
| 2010/0267538 A1 | | 10/2010 | Green et al. |
| 2010/0273627 A1 | | 10/2010 | Hudock et al. |
| 2011/0003675 A1 | | 1/2011 | Dolecek |
| 2011/0028295 A1 | | 2/2011 | Menhennett et al. |
| 2011/0059834 A1 | | 3/2011 | Eberle |
| 2011/0077140 A1 | | 3/2011 | Holmes et al. |
| 2011/0086752 A1 | | 4/2011 | Brierton |
| 2011/0100919 A1 | | 5/2011 | Dorian et al. |
| 2011/0136646 A1 | | 6/2011 | Pearce et al. |
| 2011/0136650 A1 | | 6/2011 | Ellingboe et al. |
| 2011/0152055 A1 | | 6/2011 | Pittinger et al. |
| 2011/0178453 A1 | | 7/2011 | Pages et al. |
| 2011/0224064 A1 | | 9/2011 | Pittinger et al. |

FOREIGN PATENT DOCUMENTS

| | | |
|---|---|---|
| WO | WO 9911305 A1 | 3/1999 |
| WO | WO 0054823 A1 | 9/2000 |
| WO | WO 0124848 A1 | 4/2001 |
| WO | WO 0166172 A2 | 9/2001 |
| WO | WO 2005003738 A2 | 9/2001 |
| WO | WO 2006071496 A2 | 7/2006 |
| WO | WO 2007143386 A2 | 12/2007 |
| WO | WO 2008140561 A1 | 11/2008 |
| WO | WO 2008156906 A1 | 12/2008 |
| WO | WO 2010014330 A2 | 2/2010 |
| WO | WO 2010019317 A2 | 2/2010 |
| WO | WO 2010019318 A1 | 2/2010 |
| WO | WO 2010030406 A1 | 3/2010 |

* cited by examiner

CENTRIFUGES AND CENTRIFUGE INSERTS FOR FLUID PROCESSING SYSTEMS

CROSS-REFERENCE TO RELATED APPLICATIONS

This application is a continuation of U.S. patent application Ser. No. 16/790,815, filed Feb. 14, 2020, which is a continuation of U.S. patent application Ser. No. 15/943,877, filed on Apr. 3, 2018, which is a continuation of U.S. patent application Ser. No. 15/062,323, filed on Mar. 7, 2016, which is a divisional of U.S. patent application Ser. No. 13/750,232, filed on Jan. 25, 2013, which claims the benefit of and priority of U.S. Provisional Patent Application Ser. No. 61/591,655, filed Jan. 27, 2012, and U.S. Provisional Patent Application Ser. No. 61/720,518, filed Oct. 31, 2012, the contents of which are incorporated by reference herein.

FIELD OF THE DISCLOSURE

The disclosure relates to fluid processing systems and methods. More particularly, the disclosure relates to systems and methods for centrifugally separating fluids.

DESCRIPTION OF RELATED ART

A wide variety of fluid processing systems are presently in practice and allow for a fluid to be fractionated or separated into its constituent parts. For example, various blood processing systems make it possible to collect particular blood constituents, rather than whole blood, from a blood source. Typically, in such systems, whole blood is drawn from a blood source, the particular blood component or constituent is separated, removed, and collected, and the remaining blood constituents are returned to the blood source. Removing only particular constituents is advantageous when the blood source is a human donor or patient, because potentially less time is needed for the donor's body to return to pre-donation levels, and donations can be made at more frequent intervals than when whole blood is collected. This increases the overall supply of blood constituents, such as plasma and platelets, made available for transfer and/or therapeutic treatment.

Whole blood is typically separated into its constituents through centrifugation. In continuous processes, this requires that the whole blood be passed through a centrifuge after it is withdrawn from, and before it is returned to, the blood source. To avoid contamination and possible infection (if the blood source is a human donor or patient), the blood is preferably contained within a preassembled, sterile fluid flow circuit or system during the entire centrifugation process. Typical blood processing systems thus include a permanent, reusable module or assembly containing the durable hardware (centrifuge, drive system, pumps, valve actuators, programmable controller, and the like) that spins and controls the processing of the blood and blood components through a disposable, sealed, and sterile flow circuit that includes a centrifugation chamber and is mounted in cooperation on the hardware.

The hardware engages and spins the disposable centrifugation chamber during a blood separation step. As the flow circuit is spun by the centrifuge, the heavier (greater specific gravity) components of the whole blood in the flow circuit, such as red blood cells, move radially outwardly away from the center of rotation toward the outer or "high-G" wall of the centrifugation chamber. The lighter (lower specific gravity) components, such as plasma, migrate toward the inner or "low-G" wall of the centrifuge. Various ones of these components can be selectively removed from the whole blood by providing appropriately located channeling seals and outlet ports in the flow circuit. It is known to employ centrifugation chambers that have two stages for separating different blood components such as separating or concentrating red blood cells in a first stage and platelets in a second stage.

One possible disadvantage of known systems is that the centrifuge can become unbalanced during use if one stage of a multi-stage separation chamber of the flow circuit positioned in the centrifuge is empty. To avoid centrifuge imbalance, the otherwise empty stage may be supplied with a liquid (e.g., saline) prior to centrifugation, which tends to counter-balance the fluid in the other stage. It would be advantageous to provide a flow circuit with a multi-stage separation chamber that avoids centrifuge imbalance without the need for a counter-balancing liquid.

Another possible disadvantage of known systems becomes apparent when a two-stage centrifugation chamber is used to separate platelets from whole blood. In such systems, whole blood is introduced into the first chamber and separated into red blood cells and platelet-rich plasma. The platelet-rich plasma is transferred from the first chamber to the second chamber, where it is separated into platelet-poor plasma and platelet concentrate. The platelet-poor plasma is removed from the second chamber, but the platelet concentrate may remain therein and accumulates throughout the separation procedure. At the end of the procedure, the platelets in the second chamber must be resuspended in plasma or another fluid (e.g., PAS). While effective, resuspension is a manual and operator-dependent procedure that must be performed properly. Further, a procedure requiring a final resuspension step may take longer than a procedure in which the platelets are automatically removed from the second chamber either during use or at the end of the procedure. Thus, it may be advantageous to provide a flow circuit with a multi-stage separation chamber that allows for automated removal of platelets and/or other blood component(s) from the second chamber.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a fluid separation chamber is provided for rotation about an axis in a fluid processing system. The fluid separation chamber comprises a first stage and a second stage, with the first and second stages being positioned at different axial locations.

In another aspect, a method is provided for separating a fluid. The method includes rotating a centrifuge containing a fluid about an axis and separating the fluid into a first component and a second component at a first location. One of the components is further separated at a second location, with the first and second locations being spaced along the axis.

In yet another aspect, a fluid separation chamber is provided for use in a fluid processing system. The fluid separation chamber comprises a body having a top edge, a bottom edge, and at least one side edge. A first interior wall separates the interior of the body into a first stage and a second stage. Second and third interior walls are positioned within the first stage, while a fourth interior wall is positioned within the second stage. A first fluid passage communicates with one of the edges and is defined at least in part by the first and second interior walls. A second fluid passage communicates with the one of the edges and is defined at least in part by the second and third interior walls. A third fluid passage communicates with one of the edges and is defined at least in part by the third interior wall and one of the edges. A fourth fluid passage communicates with one of the edges and is defined at least in part by the first and fourth interior walls. A fifth fluid passage communicates with one of the edges and is defined at least in part by the fourth interior wall and one of the edges. The first stage is spaced from the bottom edge by the second stage.

In another aspect, a fluid separation chamber is provided for use in a fluid processing system. The fluid separation chamber comprises a body including a top edge, a bottom edge, and at least one side edge. A first interior wall separates the interior of the body into a first stage and a second stage. Second and third interior walls are positioned within the first stage, while fourth and fifth interior walls are positioned within the second stage. A first fluid passage communicates with one of the edges and is defined at least in part by the first and second interior walls. A second fluid passage communicates with one of the edges and is defined at least in part by the second and third interior walls. A third fluid passage communicates with one of the edges and is defined at least in part by the third interior wall and one of the edges. A fourth fluid passage communicates with one of the edges and is defined at least in part by the first and fourth interior walls. A fifth fluid passage communicates with one of the edges and is defined at least in part by the fourth and fifth interior walls. A sixth fluid passage communicates with one of the edges and is defined at least in part by the fifth interior wall and one of the edges. The first stage is spaced from the bottom edge by the second stage.

In yet another aspect, a fluid separation chamber is provided for use in a fluid processing system. The fluid separation chamber comprises a body including a top edge, a bottom edge, and at least one side edge. A first interior wall separates the interior of the body into a first stage and a second stage. A second interior wall is positioned within the first stage. A first fluid passage communicates with one of the edges and is defined at least in part by the first and second interior walls. A second fluid passage communicates with one of the edges and is defined at least in part by the second interior wall and one of the edges. A third fluid passage communicates with one of the edges and is defined at least in part by the first interior wall and one of the edges. A fourth fluid passage communicates with one of the edges and is defined at least in part by the first interior wall and one of the edges. A fifth fluid passage communicates with one of the edges and is defined at least in part by the first interior wall and one of the edges. The first stage is spaced from the bottom edge by the second stage.

In another aspect, a fluid separation chamber is provided for use in a fluid processing system. The fluid separation chamber comprises a body including a top edge, a bottom edge, at least one side edge. A first interior wall separates the interior of the body into a first stage and a second stage. A second interior wall is positioned within the first stage, while a third interior wall is positioned within the second stage. A first fluid passage communicates with one of the edges and is defined at least in part by the first and second interior walls. A second fluid passage communicates with one of the edges and is defined at least in part by the second interior wall and one of the edges. A third fluid passage communicates with one of the edges and is defined at least in part by the first interior wall and one of the edges. A fourth fluid passage communicates with one of the edges and is defined at least in part by the first and third interior walls. A fifth fluid passage communicates with one of the edges and is defined at least in part by the third interior wall and one of the edges. A sixth fluid passage communicates with one of the edges and is defined at least in part by the first interior wall and one of the edges. The first stage is spaced from the bottom edge by the second stage.

In yet another aspect, a fluid separation chamber is provided for use in a fluid processing system. The fluid separation chamber comprises a body including a top surface or edge, a bottom surface or edge, and an interior wall separating the interior of the body into a first stage and a second stage. A first barrier is positioned within the first stage and a second barrier is positioned within the second stage. At least one fluid port is associated with the first stage at least one fluid port is associated with the second stage. The first stage is spaced from the bottom edge by the second stage.

In another aspect, a centrifuge is provided for rotation about an axis in a fluid processing system to generate a gravitational field. The centrifuge comprises a centrifuge bowl or rotary member with a gap or channel defined therein for receiving a fluid directly or for receiving a fluid separation chamber. The centrifuge may further comprise an inner spool and an outer bowl, with the spool and the bowl defining therebetween a gap or channel configured to receive a fluid separation chamber. The gap or channel has a non-uniform radius about the axis.

In another aspect, a centrifuge is provided for rotation about an axis in a fluid processing system to generate a centrifugal field. The centrifuge comprises a centrifuge bowl or rotary member with a gap or channel defined therein for receiving a fluid directly or for receiving a fluid separation chamber. The centrifuge may further comprise an inner spool having an outer wall and an outer bowl having an inner wall. A gap or channel is defined between the outer wall and the inner wall and configured to receive a fluid separation chamber. At least a portion of the inner wall has a varying radius along its axial height.

In yet another aspect, a fluid processing system is provided. The system comprises a centrifuge for rotation about an axis. The centrifuge includes a centrifuge bowl or rotary member with a gap or channel defined therein for receiving a fluid directly or for receiving a fluid separation chamber. The centrifuge may further comprise an inner spool and an outer bowl, with the spool and the bowl defining a gap or channel therebetween. The gap or channel comprises an arcuate first section and an arcuate second section, with the second section having a varying radius about the axis. The system further includes a fluid separation chamber comprising a first stage configured to be at least partially received within the first section of the gap or channel and a second stage configured to be at least partially received within the second section of the gap or channel. The second section comprises an outlet port configured to be positioned at the maximum radius of the second section of the gap or channel.

In another aspect, a method is provided for separating a fluid. The method includes rotating a fluid separation chamber containing a fluid about an axis and separating the fluid into a first component and a second component in a first stage of the fluid separation chamber. The method further includes separating one of the fluid components in a second stage of the fluid separation chamber, wherein at least a portion of the second stage is positioned closer to the axis than the first stage.

In yet another aspect, method is provided for separating a fluid. The method includes rotating a fluid separation chamber containing a fluid about an axis and separating the fluid into a first component and a second component. At least a portion of one of the fluid components is flowed against a surface having a varying radius along its axial height.

In another aspect, a fluid separation chamber is provided for rotation about an axis in a fluid processing system to generate a centrifugal field. The fluid separation chamber comprises: a channel defined between a low-G wall and a high-G wall and a plurality of flow paths in fluid communication with the channel. At least a portion of the channel has a non-uniform radius about the axis.

Other aspects include, but are not limited to, fluid processing systems incorporating fluid separation chambers described herein, fluid processing methods employing the fluid separation chambers and/or fluid processing systems described herein, and connection members or plates for connecting multiple stages of a fluid separation chamber.

DESCRIPTION OF THE ILLUSTRATED EMBODIMENTS

The embodiments disclosed herein are for the purpose of providing a description of the present subject matter, and it is understood that the subject matter may be embodied in various other forms and combinations not shown in detail. Therefore, specific embodiments and features disclosed herein are not to be interpreted as limiting the subject matter as defined in the accompanying claims.

Figure 1:
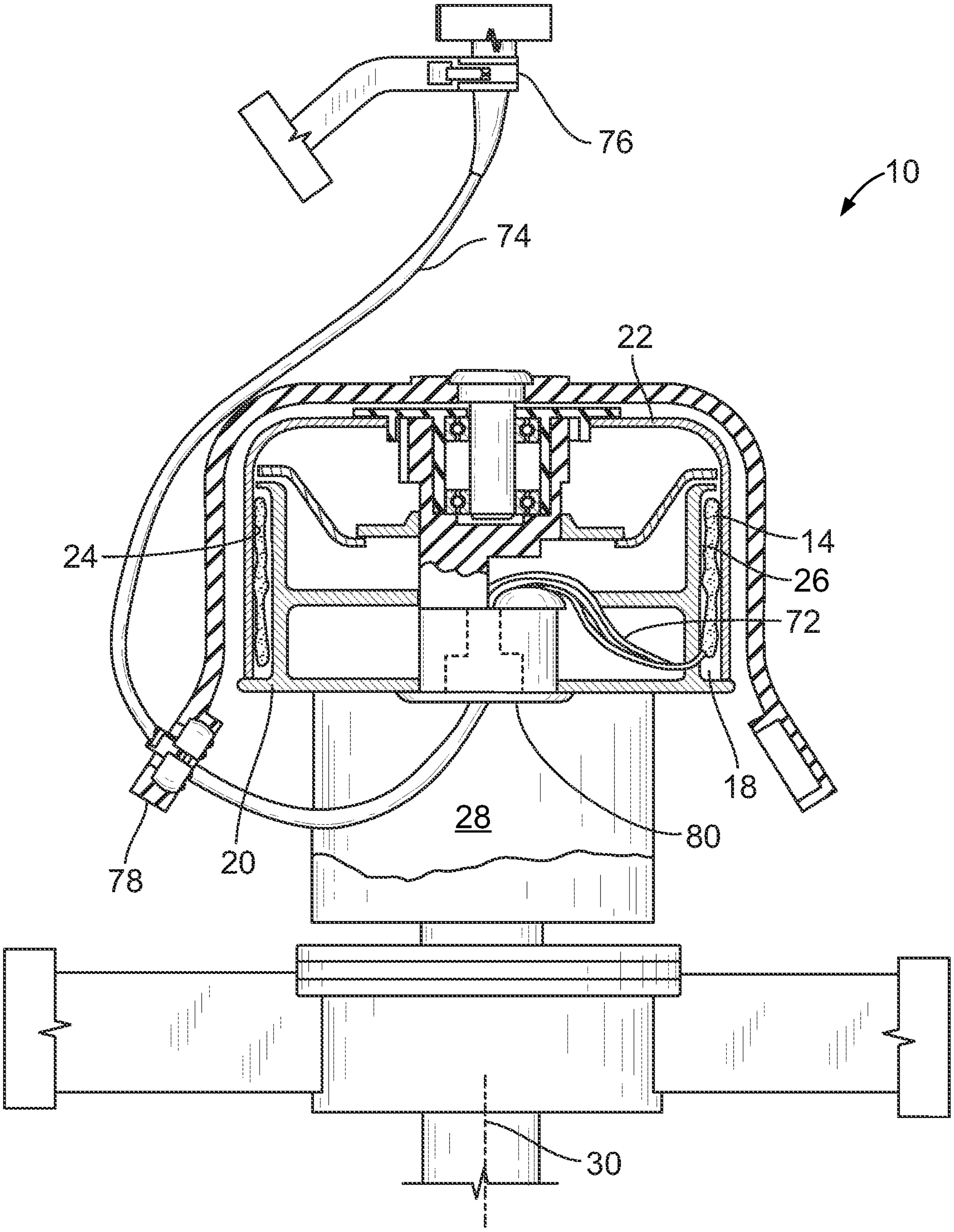
FIG. 1 is a side section view of a centrifuge receiving a fluid separation chamber that incorporates aspects of the present disclosure.

FIG. 1 shows a centrifuge 10 of a fluid processing device 12 (FIG. 5) receiving a fluid separation chamber 14 of a disposable flow circuit 16 (FIG. 5), which is suitable for separating a fluid. While the term "fluid" is frequently used herein, it is not to be construed as limiting the applicability of apparatus and methods according to the present disclosure to particular substances (e.g., blood or a suspension containing one or more blood or cell components), but is instead intended to refer to any substance which is suitable for separation or fractionation by centrifugation.

In the illustrated embodiment, the fluid separation chamber 14 is carried within a rotating assembly and, specifically within an annular gap 18 between a rotating spool 20 and bowl 22 of the centrifuge 10. The interior bowl wall 24 defines the high-G wall of a centrifugal field during use of the centrifuge 10, while the exterior spool wall 26 defines the low-G wall of the centrifugal field, as will be described in greater detail herein. Further details of an exemplary centrifuge which is suitable for use with fluid separation chambers according to the present disclosure are set forth in U.S. Pat. No. 5,370,802 to Brown, which is hereby incorporated herein by reference. In one embodiment, the centrifuge 10 comprises a component of a blood processing device of the type currently marketed as the AMICUS® separator by Fenwal, Inc. of Lake Zurich, Ill., which is an affiliate of Fresenius Kabi AG of Bad Homburg, Germany, as described in greater detail in U.S. Pat. No. 5,868,696 to Giesler et al., which is hereby incorporated herein by reference. However, as noted above, apparatus and methods described herein are not limited to separation of a particular substance and the illustrated fluid processing device 12 is merely exemplary.

Figure 2:
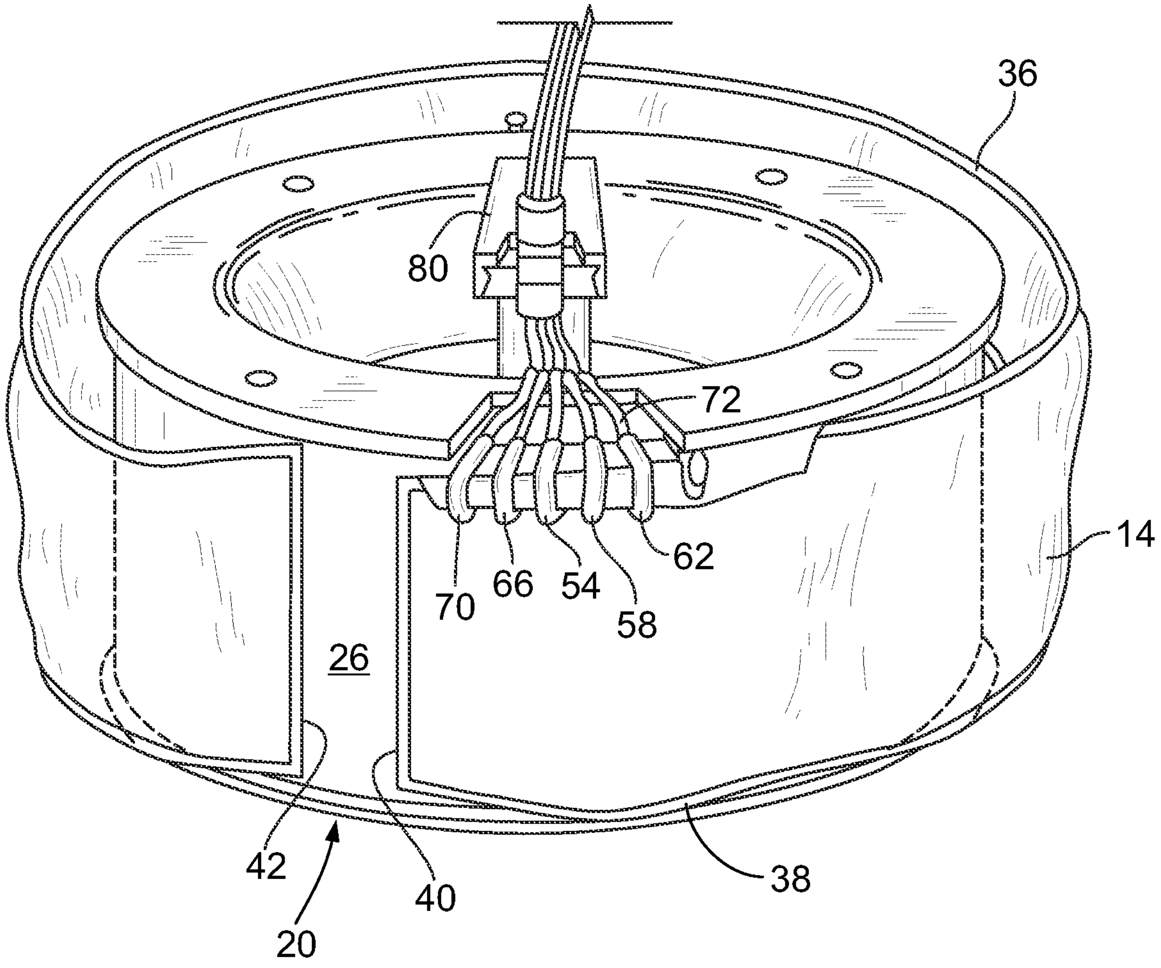
FIG. 2 shows the spool of the centrifuge of FIG. 1, with a fluid separation chamber wrapped about it for use.
Figure 3B:
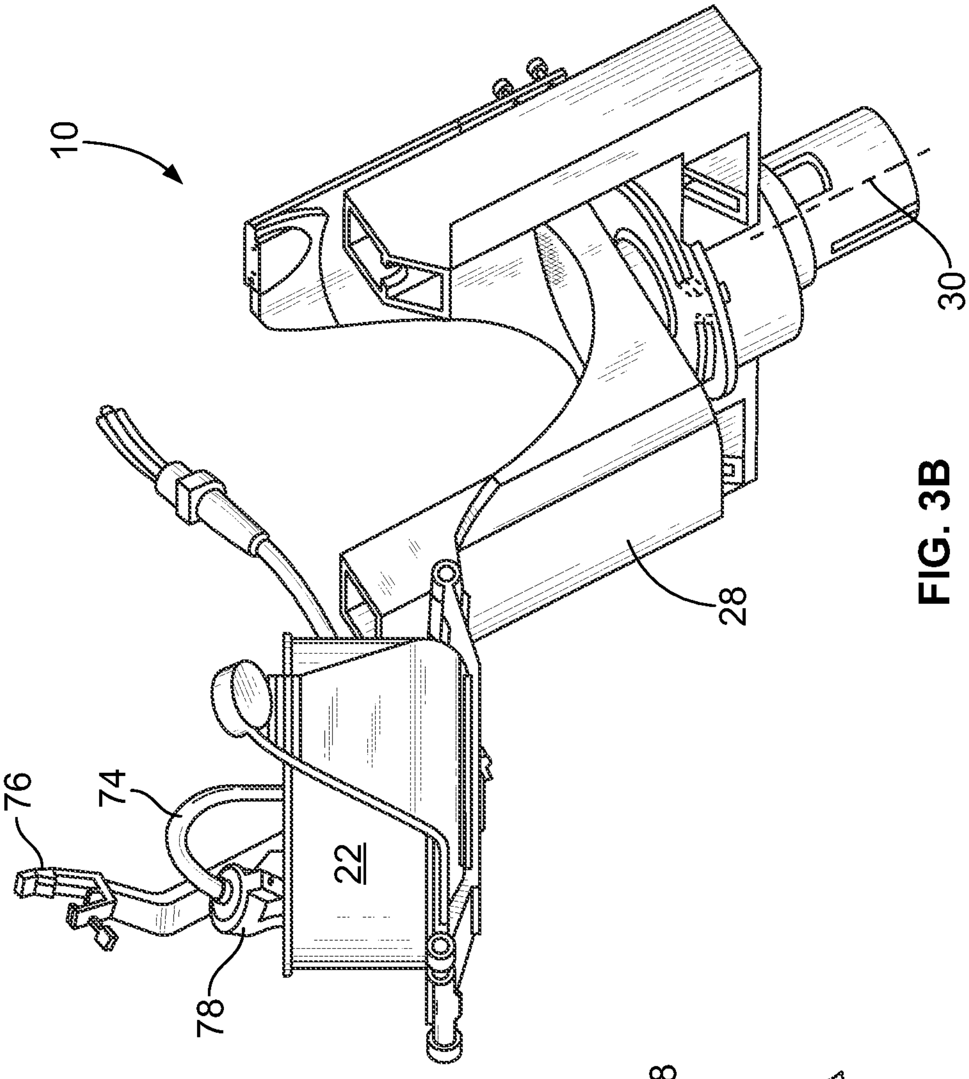
FIG. 3B is a perspective view of the bowl and spool in the loading/unloading position of FIG. 3A, with the bowl and spool in a closed condition after receiving the fluid separation chamber of FIG. 2.
Figure 3A:
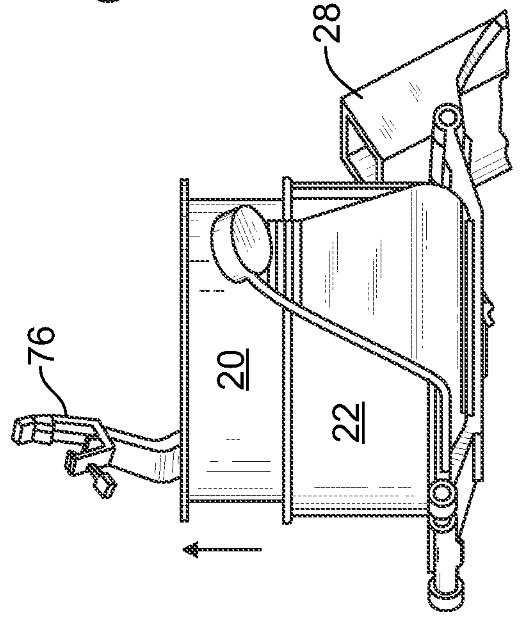
FIG. 3A is a perspective view of the centrifuge shown in FIG. 1, with the bowl and spool thereof pivoted into a loading/unloading position and in a mutually separated condition to allow the fluid separation chamber shown in FIG. 2 to be secured about the spool.

The bowl 22 and spool 20 are pivoted on a yoke 28 between an upright loading/unloading position, as shown in FIGS. 3A and 3B, and an operating position, as FIG. 1 shows. When upright, the bowl 22 and spool 20 are oriented for access by a user or technician. A mechanism permits the spool 20 and bowl 22 to be opened or separated (FIG. 3A) so that the operator can wrap the illustrated flexible fluid separation chamber 14 about the spool 20, as shown in FIG. 2.

When the fluid separation chamber 14 has been properly positioned, the spool 20 may be moved back into the bowl 22 (FIG. 3B), and the spool 20 and bowl 22 can be pivoted into the operating position of FIG. 1. As will be described in greater detail herein, the centrifuge 10 rotates the bowl 22 spool 20 about an axis 30, creating a centrifugal field within the fluid separation chamber 14 to separate or fractionate a fluid.

According to an aspect of the present disclosure, the fluid separation chamber 14 is provided with a plurality of stages or sub-chambers, such as a first stage or sub-chamber or compartment and a second stage or sub-chamber or compartment. For purposes of this description, the terms "first" and "second" are denominational only for purposes of identification and do not refer to or require a particular sequence of operation or fluid flow.

Figure 4:
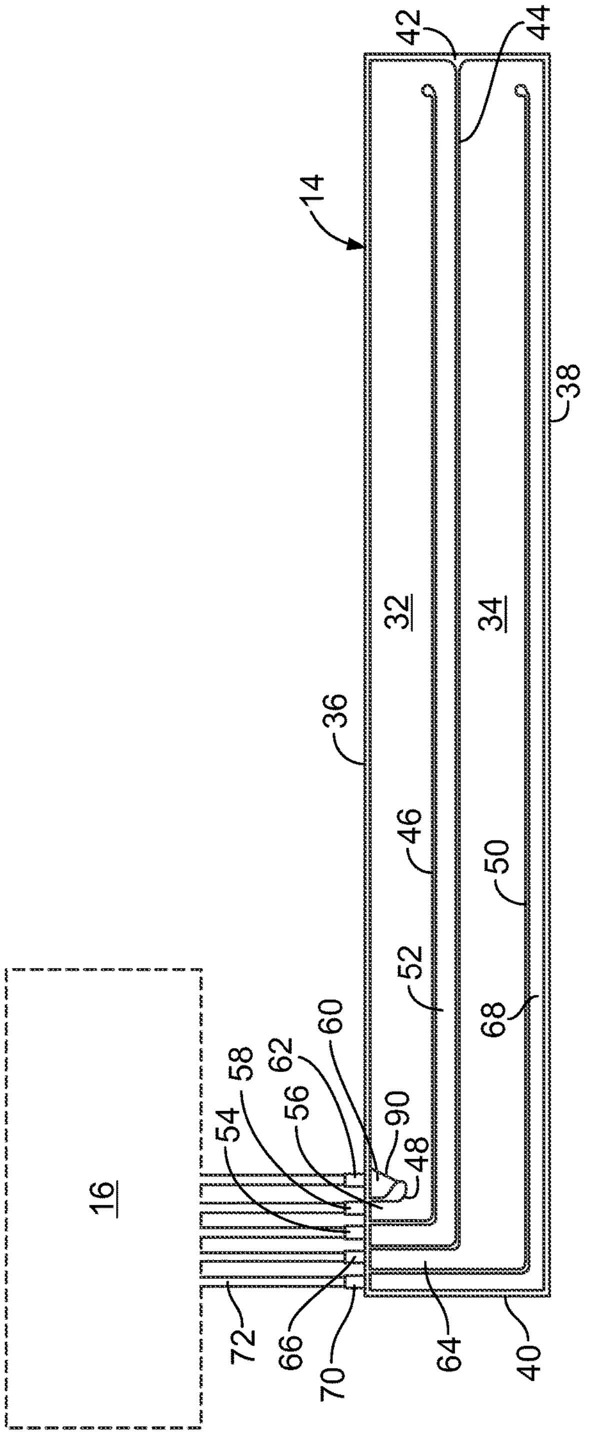
FIG. 4 is a plan view of the fluid separation chamber shown in FIG. 2.

In the illustrated embodiment, the first and second stages are positioned at different axial locations (with respect to the axis 30) when the fluid separation chamber 14 is loaded within the centrifuge 10. FIG. 4 illustrates an exemplary fluid separation chamber 14 having such first and second stages 32 and 34. By employing stages which are spaced along the axis 30, the centrifuge 10 does not tend to become imbalanced during use if one of the stages contains a fluid while the other is empty. For example, absent the use of a counter-balancing fluid, the downstream stage of a two-stage separation chamber would typically be empty during priming of the flow circuit, which may take place while the centrifuge is spinning. If the stages are positioned at different angular locations with respect to the rotational axis, the presence of fluid in only one of the stages may lead to centrifugal imbalance, which can cause wear or damage to the centrifuge. As noted above, a counter-balancing fluid is commonly provided in the downstream stage to prevent this imbalance. On the other hand, in fluid separation chambers according to this aspect of the present disclosure, fluid may be present in only one of the stages (e.g., during priming) without causing a centrifugal imbalance. Thus, fluid separation chambers according to the present disclosure eliminate the need for a counter-balancing fluid in the downstream chamber, thereby making it easier for the associated flow circuit to be primed by the fluid to be separated or fractionated. This may also decrease the time required to prime the flow circuit.

As illustrated, the stages 32 and 34 are located at substantially the same radial distance from the axis of rotation 30. In other embodiments, as will be described in greater detail herein, the stages 32 and 34 may be located at different radial distances from the axis of rotation 30.

In the embodiment illustrated in FIG. 4, the fluid separation chamber 14 is provided as a flexible body with a seal extending around its perimeter to define a top edge 36, a bottom edge 38, and a pair of side edges 40 and 42. A first interior seal or wall 44 divides the interior of the fluid separation chamber 14 into first and second stages 32 and 34. The first interior wall 44 may be variously configured without departing from the scope of this aspect of the present disclosure, provided that it is configured to place the first and second stages 32 and 34 at different axial locations during use of the centrifuge 10 to separate a fluid therein. FIG. 4 shows the first stage 32 positioned above the second stage 34, but the orientation of the stages 32 and 34 is reversed when the fluid separation chamber 14 has been mounted within the centrifuge 10 (FIG. 1). Hence, the first stage 32 may be considered the "lower stage," while the second stage 34 may be considered the "upper stage" when the centrifuge 10 is in an operating position. However, it is within the scope of the present disclosure to provide a first stage which is positioned above the second stage (i.e., at a higher elevation along the rotational axis) during use.

In the illustrated embodiment, the first interior wall 44 extends in a dogleg or L-shaped manner from the top edge 36 toward the bottom edge 38, but extends to terminate at one of the side edges 42 without contacting the bottom edge 38. Thus, the region of the interior of the fluid separation chamber 14 defined by the top edge 36, the first interior wall 44, and the right side edge 42 comprises the first stage 32, while the region defined by the top edge 36, the bottom edge 38, the first interior wall 44, and the two side edges 40 and 42 comprises the second stage 34. It will be seen that, in the embodiment of FIG. 4, the first stage 32 is, in substantial part, spaced from the bottom edge 38 of the fluid separation chamber 14 by the second stage 34.

In addition to the first interior wall 44, the illustrated fluid separation chamber 14 includes additional interior walls or seals. The first stage 32 includes two interior seals or walls 46 and 48, which are referred to herein as second and third interior walls, respectively. The second stage 34 includes one interior seal or wall 50, which is referred to herein as the fourth interior wall. In the embodiment of FIG. 4, each interior wall extends in a dogleg or L-shaped manner from the top edge 36 toward the bottom edge 38 and then (in varying degrees) toward the right side edge 42, without contacting either the bottom edge 38 or the right side edge 42. It is within the scope of the present disclosure for these interior walls to be otherwise configured without departing from the scope of the present disclosure. Further, it is within the scope of the present disclosure for the fluid separation chamber to include more (FIG. 6) or fewer than four interior walls or seals.

The interior walls of the fluid separation chamber 14 help to define fluid passages which allow for fluid communication between the flow circuit 16 and the first and second stages 32 and 34. In the embodiment of FIG. 4, a first fluid passage 52 is defined at least in part by the first and second interior walls 44 and 46 to allow fluid communication between the first stage 32 and the flow circuit 16 via a port 54 extending through the top edge 36. A second fluid passage 56 is defined at least in part by the second and third interior walls 46 and 48 to allow fluid communication between the first stage 32 and the flow circuit 16 via a port 58 extending through the top edge 36. A third fluid passage 60 is defined at least in part by the third interior wall 48 and the top edge 36 to allow fluid communication between the first stage 32 and the flow circuit 16 via a port 62 extending through the top edge 36. A fourth fluid passage 64 is defined at least in part by the first and fourth interior walls 44 and 50 to allow fluid communication between the second stage 34 and the flow circuit 16 via a port 66 extending through the top edge 36. A fifth fluid passage 68 is defined at least in part by the fourth interior wall 50, the left side edge 40, and the bottom edge 38 to allow fluid communication between the second stage 34 and the flow circuit 16 via a port 70 extending through the top edge 36. While FIG. 4 shows all of the ports and fluid passages associated with the top edge, it is within the scope of the present disclosure for one or more of the ports and fluid passages to be instead associated with a side edge or bottom edge of the fluid separation chamber. An exemplary use for each of the fluid passages during a fluid separation procedure will be described in greater detail below.

The ports may be made of a generally more rigid material and configured to accommodate flexible tubing 72 which connects the fluid separation chamber 14 to the remainder of the flow circuit 16. In the illustrated embodiment, portions of the tubing 72 are joined to define an umbilicus 74 (FIG. 1). A non-rotating (zero omega) holder 76 holds an upper portion of the umbilicus 74 in a non-rotating position above the spool 20 and bowl 22. A holder 78 on the yoke 28 rotates an intermediate portion of the umbilicus 74 at a first (one omega) speed about the spool 20 and bowl 22. Another holder 80 rotates a lower end of the umbilicus 74 at a second speed twice the one omega speed (referred to herein as the two omega speed), at which the spool 20 and bowl 22 also rotate to create a centrifugal field within the fluid separation chamber 14. This known relative rotation of the umbilicus 74 keeps it untwisted, in this way avoiding the need for rotating seals.

Figure 5:
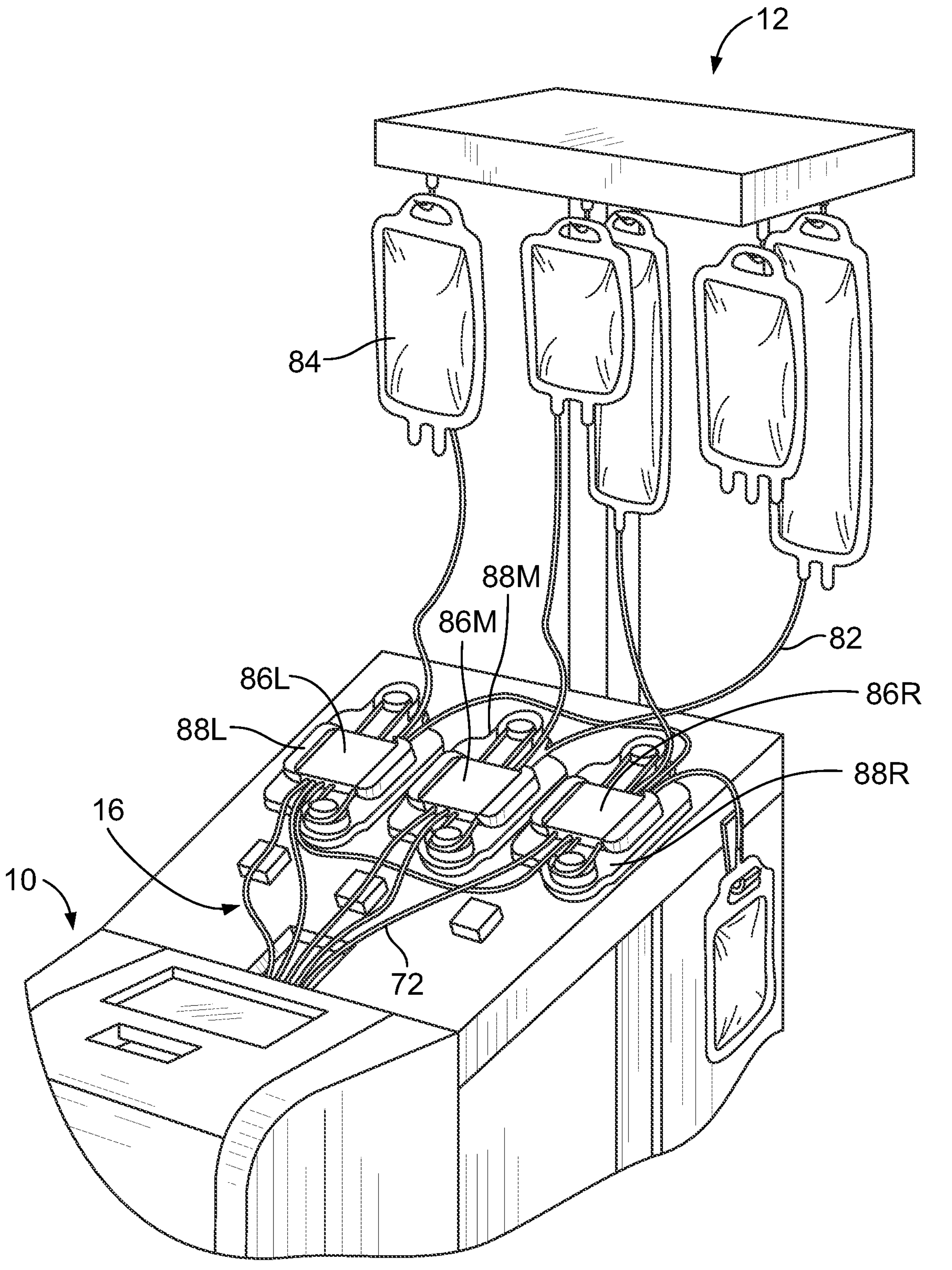
FIG. 5 is a perspective view of a disposable flow circuit (of which the fluid separation chamber comprises a component), which includes cassettes mounted in association with pump stations of a fluid separation device (of which the centrifuge comprises a component)

FIG. 5 shows the general layout of an exemplary flow circuit 16, in terms of an array of flexible tubing 82, fluid source and collection containers 84, and fluid-directing cassettes. In the illustrated embodiment, left, middle, and right cassettes 86L, 86M, and 86R (respectively), centralize many of the valving and pumping functions of the flow circuit 16. The left, middle, and right cassettes 86L, 86M, and 86R mate with left, middle, and right pump stations 88L, 88M, and 88R (respectively) of the fluid processing device 12. The tubing 82 couples the various elements of the flow circuit 16 to each other and to a fluid source, which may be a human body, but may also be one of the containers 84 or some other non-human source. Additional details of an exemplary flow circuit and fluid processing device suitable for use with fluid separation chambers according to the present disclosure are set forth in U.S. Pat. No. 6,582,349 to Cantu et al., which is hereby incorporated herein by reference.

The fluid separation chamber 14 may be used for either single- or multi-stage processing. When used for single-stage processing, a fluid is flowed into one of the stages (typically the first stage 32), where it is separated into at least two components. All or a portion of one or both of the components may then be flowed out of the first stage 32 and harvested or returned to the fluid source. When used for multi-stage processing, a fluid is flowed into the first stage 32 and separated into at least a first component and a second component. At least a portion of one of the components is then flowed into the second stage 34, where it is further separated into at least two sub-components. The component not flowed into the second stage 34 may be flowed out of the first stage 32 and harvested or returned to the fluid source. As for the sub-components, at least a portion of one may be flowed out of the second stage 34 for harvesting or return to the fluid source, while the other remains in the second stage 34.

In an exemplary multi-stage fluid processing application, the fluid separation chamber 14 is used to separate whole blood into platelet-rich plasma and red blood cells in the first stage 32. The platelet-rich plasma is then flowed into the second stage 34, where it is separated into platelet concentrate and platelet-poor plasma. In the exemplary procedure, whole blood is flowed into the first stage 32 of a fluid separation chamber 14 received in a spinning centrifuge 10 (as in FIG. 1). The whole blood enters the first stage 32 via port 58 and the second fluid passage 56 (FIG. 4). The centrifugal field present in the fluid separation chamber 14 acts upon the blood to separate it into a layer substantially comprised of platelet-rich plasma and a layer substantially comprised of red blood cells. The higher density component (e.g., red blood cells) gravitates toward the high-G wall 24, while the lower density component (e.g., platelet-rich plasma) remains closer to the low-G wall 26 (FIG. 1). The red blood cells are flowed out of the first stage 32 via port 54 and the first fluid passage 52 (FIG. 4), where they are either harvested or returned to the blood source. The platelet-rich plasma is flowed out of the first stage 32 via port 62 and the third fluid passage 60. The high-G wall 24 may include a projection or dam 90 (FIG. 4) which extends toward the low-G wall 26, across the third fluid passage 60. The dam 90 is configured to intercept red blood cells adjacent thereto and prevent them from entering the third fluid passage 60 and thereby contaminating the platelet-rich plasma. The term "contaminating" as used here means having more of a component (here, more red blood cells) in the fluid flowing to the second stage (here, plasma) than is desired and does not refer to or imply a biological hazard.

The platelet-rich plasma flowed out of the first stage 32 is directed into second stage 34, such as by operation of one or more of the flow control cassettes of the flow circuit 16. The platelet-rich plasma enters the second stage 34 via port 66 and the fourth fluid passage 64. The centrifugal field acts upon the platelet-rich plasma to separate it into a layer substantially comprised of platelet concentrate and a layer substantially comprised of platelet-poor plasma. The higher density component (e.g., platelet concentrate) gravitates toward the high-G wall 24, while the lower density component (e.g., platelet-poor plasma) remains closer to the low-G wall 26 (FIG. 1). The platelet-poor plasma is flowed out of the second stage 34 via port 70 and the fifth fluid passage 68 (FIG. 4), where it is either harvested or returned to the blood source. The platelet concentrate remains in the second stage 34, where it may be stored for later use.

When used for processing blood, a blood component, or any other body fluid, devices and methods according to the present disclosure may be used with any suitable fluid source. For example, the fluid source may be a living human or non-human animal whose bodily fluid is directly drawn into the device for processing. In other embodiments, the fluid to be processed does not come directly from a living human or non-human animal, but is instead provided directly from a non-living source, such as a container holding an amount of fresh or stored fluid (e.g., blood or a blood component that has been previously drawn from a living source and stored). In additional embodiments, there may be a plurality of fluid sources, which may all be living sources or non-living sources or a combination of living and non-living sources.

Figure 6:
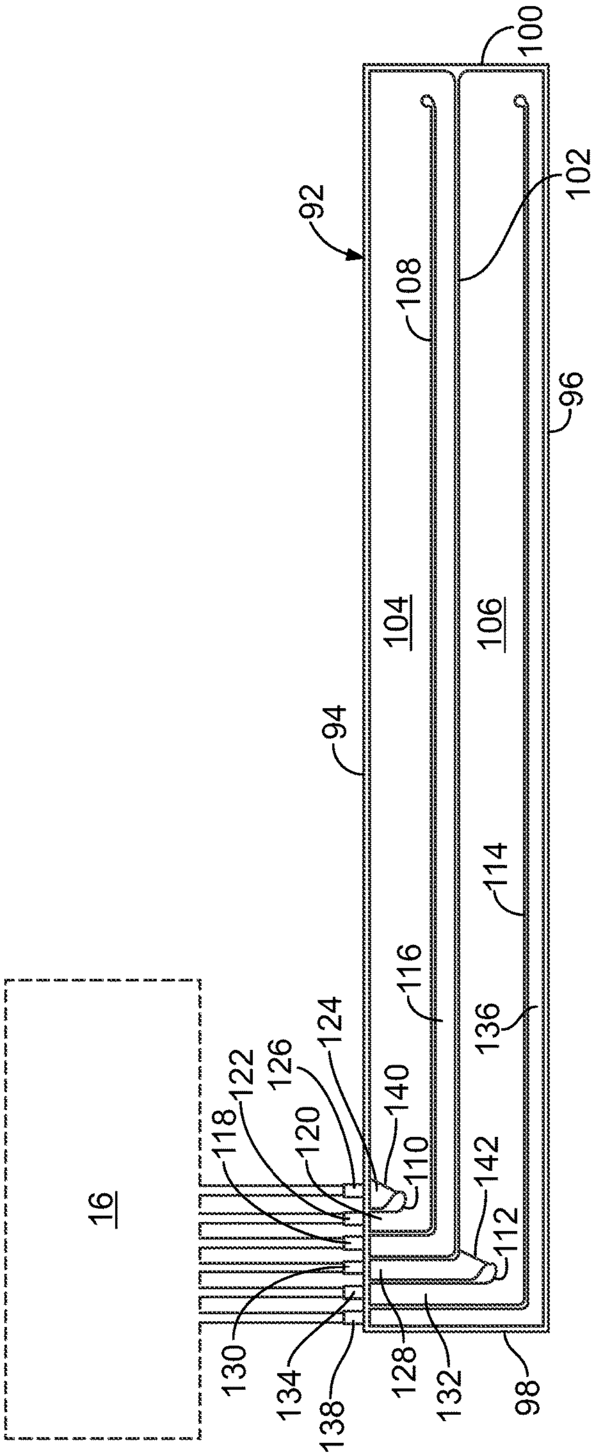
FIG. 6 is a plan view of an alternative fluid separation chamber that incorporates aspects of the present disclosure.

An alternative embodiment of a fluid separation chamber is illustrated in FIG. 6. The fluid separation chamber 92 of FIG. 6 is structurally comparable to the fluid separation chamber 14 of FIG. 4. The fluid separation chamber 92 is provided as a flexible body with a seal extending around its perimeter to define a top edge 94, a bottom edge 96, and a pair of side edges 98 and 100. A first interior seal or wall 102 divides the interior of the fluid separation chamber 92 into first and second stages 104 and 106. As in the embodiment of FIG. 4, the illustrated first interior wall 102 extends from the top edge 94 toward the bottom edge 96, but extends to terminate at one of the side edges 100 without contacting the bottom edge 96. Thus, the region of the interior of the fluid separation chamber 92 defined by the top edge 94, the first interior wall 102, and the right side edge 100 comprises the first stage 104, while the region defined by the top edge 94, the bottom edge 96, the first interior wall 102, and the two side edges 98 and 100 comprises the second stage 106. As in the embodiment of FIG. 4, the first stage 104 is spaced from the bottom edge 96 of the fluid separation chamber 92 by the second stage 106.

In addition to the first interior wall 102, the illustrated fluid separation chamber 92 includes additional interior walls or seals. The first stage 104 includes two interior seals or walls 108 and 110, which are referred to herein as second and third interior walls, respectively. The second stage 106 includes two more interior seals or walls 112 and 114, which are referred to herein as the fourth and fifth interior walls, respectively. As in the embodiment of FIG. 4, each interior wall extends from the top edge 94 toward the bottom edge 96 and then (in varying degrees) toward the right side edge 100, without contacting either the bottom edge 96 or the right side edge 100. It is within the scope of the present disclosure for these interior walls to be otherwise configured without departing from the scope of the present disclosure.

The interior walls of the fluid separation chamber 92 help to define fluid passages which allow for fluid communication between the flow circuit 16 and the first and second stages 104 and 106. In the embodiment of FIG. 6, a first fluid passage 116 is defined at least in part by the first and second interior walls 102 and 108 to allow fluid communication between the first stage 104 and the flow circuit 16 via a port 118 extending through the top edge 94. A second fluid passage 120 is defined at least in part by the second and third interior walls 108 and 110 to allow fluid communication between the first stage 104 and the flow circuit 16 via a port 122 extending through the top edge 94. A third fluid passage 124 is defined at least in part by the third interior wall 110 and the top edge 94 to allow fluid communication between the first stage 104 and the flow circuit 16 via a port 126 extending through the top edge 94. A fourth fluid passage 128 is defined at least in part by the first and fourth interior walls 102 and 112 to allow fluid communication between the second stage 106 and the flow circuit 16 via a port 130 extending through the top edge 94. A fifth fluid passage 132 is defined at least in part by the fourth and fifth interior walls 112 and 114 to allow fluid communication between the second stage 106 and the flow circuit 16 via a port 134 extending through the top edge 94. A sixth fluid passage 136 is defined at least in part by the fifth interior wall 114, the left side edge 98, and the bottom edge 96 to allow fluid communication between the second stage 106 and the flow circuit 16 via a port 138 extending through the top edge 94. While FIG. 6 shows all of the ports and fluid passages associated with the top edge, it is within the scope of the present disclosure for one or more of the ports and fluid passages to be instead associated with a side edge or bottom edge of the fluid separation chamber. An exemplary use for each of the fluid passages during a fluid separation procedure will be described in greater detail below. As for the ports and the remainder of the flow circuit 16 of which the fluid separation chamber 94 is a component, they may conform to the preceding description of the ports and flow circuit 16 associated with the fluid separation chamber 14 of FIG. 4, with the exception that the flow circuit is configured to accommodate an additional fluid passage and port.

Similar to the fluid separation chamber 14 of FIG. 4, the fluid separation chamber 92 of FIG. 6 may be used for either single- or multi-stage processing. When used for single-stage processing, a fluid is flowed into one of the stages (typically the first stage 104), where it is separated into at least two components. All or a portion of one or both of the components may then be flowed out of the first stage 104 and harvested or returned to the fluid source. When used for multi-stage processing, a fluid is flowed into the first stage 104 and separated into at least a first component and a second component. At least a portion of one of the components is then flowed into the second stage 106, where it is further separated into at least two sub-components. The component not flowed into the second stage 106 may be flowed out of the first stage 104 and harvested or returned to the fluid source. As for the sub-components, at least a portion of one or both may be flowed out of the second stage 106 for harvesting or return to the fluid source.

In an exemplary multi-stage fluid processing application, the fluid separation chamber 92 is used to separate whole blood into platelet-rich plasma and red blood cells in the first stage 104. The platelet-rich plasma is then flowed into the second stage 106, where it is separated into platelet concentrate and platelet-poor plasma. In the exemplary procedure, whole blood is flowed into the first stage 104 of a fluid separation chamber 92 received in a spinning centrifuge 10 (as in FIG. 1). The whole blood enters the first stage 104 via port 122 and the second fluid passage 120 (FIG. 6). The centrifugal field present in the fluid separation chamber 92 acts upon the blood to separate it into a layer substantially comprised of platelet-rich plasma and a layer substantially comprised of red blood cells. The higher density component (red blood cells) gravitates toward the high-G wall 24, while the lower density component (platelet-rich plasma) remains closer to the low-G wall 26 (FIG. 1). The red blood cells are flowed out of the first stage 104 via port 118 and the first fluid passage 116 (FIG. 6), where they are either harvested or returned to the blood source. The platelet-rich plasma is flowed out of the first stage 104 via port 126 and the third fluid passage 124. The high-G wall 24 may include a first projection or dam 140 (FIG. 6) which extends toward the low-G wall 26, across the third fluid passage 124. The first dam 140 is configured to intercept red blood cells adjacent thereto and prevent them from entering the third fluid passage 124 and thereby contaminating the platelet-rich plasma.

The platelet-rich plasma flowed out of the first stage 104 is directed into the second stage 106 by operation of one or more of the cassettes of the flow circuit 16. The platelet-rich plasma enters the second stage 106 via port 134 and the fifth fluid passage 132. The centrifugal field acts upon the platelet-rich plasma to separate it into a layer substantially comprised of platelet concentrate and a layer substantially comprised of platelet-poor plasma. The higher density component (platelet concentrate) gravitates toward the high-G wall 24, while the lower density component (platelet-poor plasma) remains closer to the low-G wall 26 (FIG. 1). The platelet concentrate is flowed out of the second stage 106 via port 130 and the fourth fluid passage 128 (FIG. 6), where it is either harvested or returned to the blood source. The platelet-poor plasma is flowed out of the second stage 106 via port 138 and the sixth fluid passage 136, where it is either harvested or returned to the blood source. The low-G wall 26 may include a second projection or dam 142 (FIG. 6) which extends toward the high-G wall 24, across the fourth fluid passage 128. The second dam 142 is configured to intercept platelet-poor plasma adjacent thereto and prevent it from entering the fourth fluid passage 128 and thereby diluting the platelet concentrate.

Figure 7:
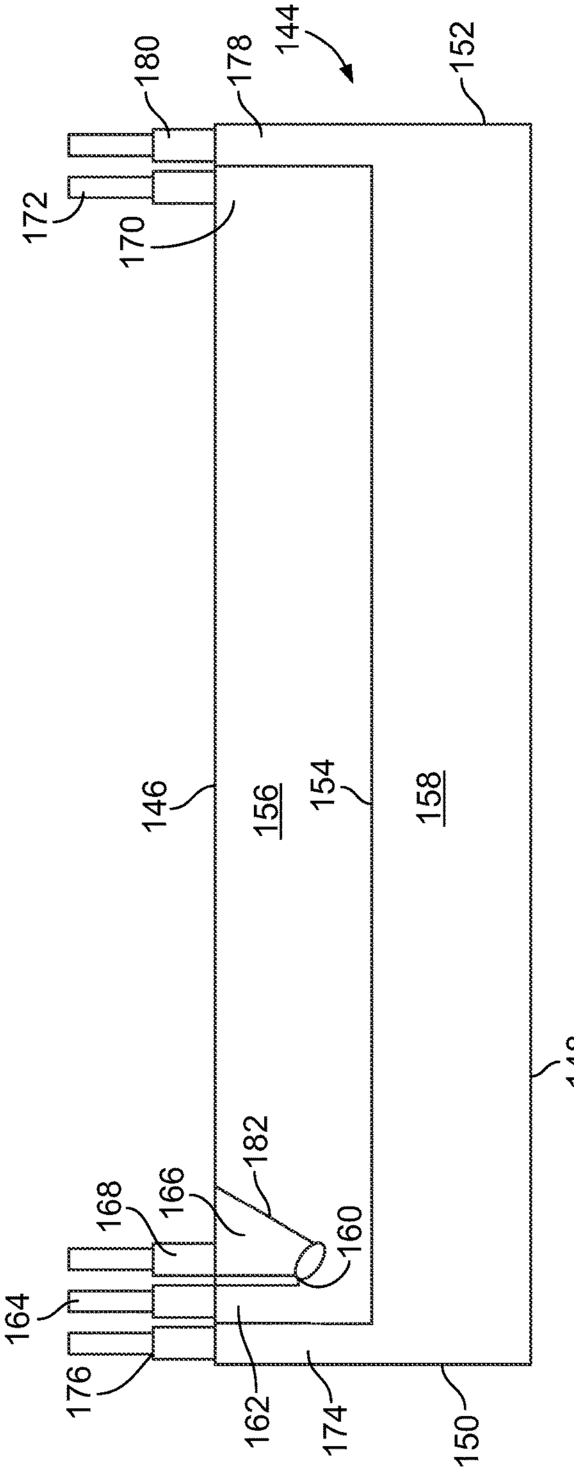
FIG. 7 is a plan view of another alternative fluid separation chamber that incorporates aspects of the present disclosure.

FIG. 7 shows an alternative embodiment of a fluid separation chamber 144 provided as a body with a top edge 146, a bottom edge 148, and a pair of side edges 150 and 152. A first interior seal or wall 154 divides the interior of the fluid separation chamber 144 into first and second stages 156 and 158. In the illustrated embodiment, the first interior wall 154 extends in a generally U-shaped manner from the top edge 146 toward the bottom edge 148, toward one of the side edges 150, 152, and then back to terminate at the top edge 146. Thus, the region of the interior of the fluid separation chamber 144 defined by the top edge 146 and the first interior wall 154 comprises the first stage 156, while the remainder of the interior of the fluid separation chamber 144 comprises the second stage 158. It will be seen that, in the embodiment of FIG. 7, the first stage 156 is, in substantial part, spaced from the bottom edge 148 of the fluid separation chamber 144 by the second stage 158.

Figure 8:
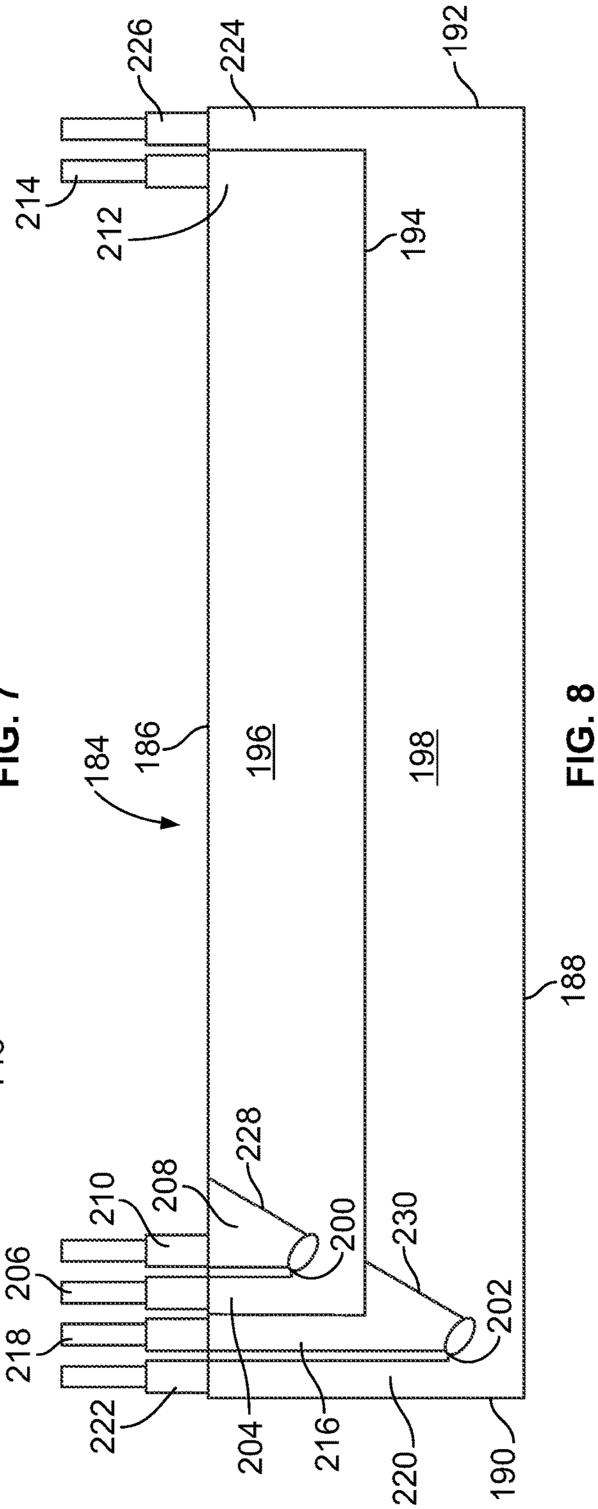
FIG. 8 is a plan view of yet another alternative fluid separation chamber that incorporates aspects of the present disclosure.

In addition to the first interior wall 154, the illustrated fluid separation chamber 144 includes a second interior seal or wall 160 positioned within the first stage 156. In the embodiment of FIG. 7, the second interior wall 160 extends in a dogleg or L-shaped manner from the top edge 146 toward the bottom edge 148 and then toward the right side edge 152, without contacting the first interior wall 154. It is within the scope of the present disclosure for the second interior wall to be otherwise configured without departing from the scope of the present disclosure. Further, it is within the scope of the present disclosure to provide the second chamber with an interior seal or wall positioned therein (as shown in FIG. 8 and described in greater detail below).

The interior walls 154 and 160 of the fluid separation chamber 144 help to define fluid passages which allow for fluid communication between the flow circuit and the first and second stages 156 and 158. In the embodiment of FIG. 7, a first fluid passage 162 is defined at least in part by the left side of the first interior wall 154 and the second interior wall 160 to allow fluid communication between the first stage 156 and the rest of the flow circuit via a port 164 extending through the top edge 146. A second fluid passage 166 is defined at least in part by the second interior wall 160 and the top edge 146 to allow fluid communication between the first stage 156 and the flow circuit via a port 168 extending through the top edge 146. A third fluid passage 170 is defined at least in part by the right side of the first interior wall 154 and the top edge 146 to allow fluid communication between the first stage 156 and the flow circuit via a port 172 extending through the top edge 146. A fourth fluid passage 174 is defined at least in part by the left side edge 150 and the left side of the first interior wall 154 to allow fluid communication between the second stage 158 and the flow circuit via a port 176 extending through the top edge 146. A fifth fluid passage 178 is defined at least in part by the right side edge 152 and the right side of the first interior wall 154 to allow fluid communication between the second stage 158 and the flow circuit via a port 180 extending through the top edge 146. While FIG. 7 shows all of the ports and fluid passages associated with the top edge, it is within the scope of the present disclosure for one or more of the ports and fluid passages to be instead associated with a side edge or bottom edge of the fluid separation chamber. An exemplary use for each of the fluid passages during a fluid separation procedure will be described in greater detail below.

The fluid separation chamber 144 may be used for either single- or multi-stage processing. When used for single-stage processing, a fluid is flowed into one of the stages (typically the first stage 156), where it is separated into at least two components. All or a portion of one or both of the components may then be flowed out of the first stage 156 and harvested or returned to the fluid source. When used for multi-stage processing, a fluid is flowed into the first stage 156 and separated into at least a first component and a second component. At least a portion of one of the components is then flowed into the second stage 158, where it is further separated into at least two sub-components. The component not flowed into the second stage 158 may be flowed out of the first stage 156 and harvested or returned to the fluid source. As for the sub-components, at least a portion of one may be flowed out of the second stage 158 for harvesting or return to the fluid source, while the other remains in the second stage 158.

In an exemplary multi-stage fluid processing application, the fluid separation chamber 144 is used to separate whole blood into platelet-rich plasma and red blood cells in the first stage 156. The platelet-rich plasma is then flowed into the second stage 158, where it is separated into platelet concentrate and platelet-poor plasma. In the exemplary procedure, whole blood is flowed into the first stage 156 of a fluid separation chamber 144 received in a spinning centrifuge 10 (as in FIG. 1). The whole blood enters the first stage 156 via port 164 and the first fluid passage 162. The centrifugal field present in the fluid separation chamber 144 acts upon the blood to separate it into a layer substantially comprised of platelet-rich plasma and a layer substantially comprised of red blood cells. The higher density component (e.g., red blood cells) gravitates toward the high-G wall 24, while the lower density component (e.g., platelet-rich plasma) remains closer to the low-G wall 26 (FIG. 1). The red blood cells are flowed out of the first stage 156 via port 172 and the third fluid passage 170 (FIG. 7), where they are either harvested or returned to the blood source. The platelet-rich plasma is flowed out of the first stage 156 via port 168 and the second fluid passage 166. The high-G wall 24 may include a projection or dam 182 which extends toward the low-G wall 26, across the second fluid passage 166. The dam 182 is configured to intercept red blood cells adjacent thereto and prevent them from entering the second fluid passage 166 and thereby contaminating the platelet-rich plasma.

The platelet-rich plasma flowed out of the first stage 156 is directed into the second stage 158, such as by operation of one or more of the flow control cassettes of the flow circuit. The platelet-rich plasma enters the second stage 158 via port 176 or 180 and the associated fluid passage. The centrifugal field acts upon the platelet-rich plasma to separate it into a layer substantially comprised of platelet concentrate and a layer substantially comprised of platelet-poor plasma. The higher density component (e.g., platelet concentrate) gravitates toward the high-G wall 24, while the lower density component (e.g., platelet-poor plasma) remains closer to the low-G wall 26 (FIG. 1). The platelet-poor plasma is flowed out of the second stage 158 via the other port (i.e., out of port 180 if the platelet-rich plasma entered the second stage 158 via port 176 or out of port 176 if the platelet-rich plasma entered the second stage 158 via port 180) and the associated fluid passage (FIG. 7), where it is either harvested or returned to the blood source. The platelet concentrate remains in the second stage 158, where it may be stored for later use.

Another alternative embodiment of a fluid separation chamber is illustrated in FIG. 8. The fluid separation chamber 184 of FIG. 8 is structurally comparable to the fluid separation chamber 144 of FIG. 7. The fluid separation chamber 184 is provided as a body with a top edge 186, a bottom edge 188, and a pair of side edges 190 and 192. A first interior seal or wall 194 divides the interior of the fluid separation chamber 184 into first and second stages 196 and 198. As in the embodiment of FIG. 7, the illustrated first interior wall 194 extends from the top edge 186 toward the bottom edge 188, toward one of the side edges 190, 192, and then back to terminate at the top edge 186. Thus, the region of the interior of the fluid separation chamber 184 defined by the top edge 186 and the first interior wall 194 comprises the first stage 196, while the remainder of the interior comprises the second stage 198. As in the embodiment of FIG. 7, the first stage 196 is spaced from the bottom edge 188 of the fluid separation chamber 184 by the second stage 198.

In addition to the first interior wall 194, the illustrated fluid separation chamber 184 includes additional interior walls or seals. The first stage 196 includes an interior seal or wall 200 referred to herein as the second interior wall. The second stage 198 also includes an interior seal or wall 202, which is referred to herein as the third interior wall. As in the embodiment of FIG. 7, these interior walls extend from the top edge 186 toward the bottom edge 188 and then (in varying degrees) toward the right side edge 192. It is within the scope of the present disclosure for these interior walls to be otherwise configured without departing from the scope of the present disclosure.

The interior walls of the fluid separation chamber 184 help to define fluid passages which allow for fluid communication between the flow circuit and the first and second stages 196 and 198. In the embodiment of FIG. 8, a first fluid passage 204 is defined at least in part by a left side of the first interior wall 194 and the second interior wall 200 to allow fluid communication between the first stage 196 and the flow circuit via a port 206 extending through the top edge 186. A second fluid passage 208 is defined at least in part by the second interior wall 200 and the top edge 186 to allow fluid communication between the first stage 196 and the flow circuit via a port 210 extending through the top edge 186. A third fluid passage 212 is defined at least in part by a right side of the first interior wall 194 and the top edge 186 to allow fluid communication between the first stage 196 and the flow circuit via a port 214 extending through the top edge 186. A fourth fluid passage 216 is defined at least in part by the first and third interior walls 194 and 202 to allow fluid communication between the second stage 198 and the flow circuit via a port 218 extending through the top edge 184. A fifth fluid passage 220 is defined at least in part by the left side edge 190 and the third interior wall 202 to allow fluid communication between the second stage 198 and the flow circuit via a port 222 extending through the top edge 186. A sixth fluid passage 224 is defined at least in part by a right side of the first interior wall 194 and the right side edge 192 to allow fluid communication between the second stage 198 and the flow circuit via a port 226 extending through the top edge 186. While FIG. 8 shows all of the ports and fluid passages associated with the top edge, it is within the scope of the present disclosure for one or more of the ports and fluid passages to be instead associated with a side edge or bottom edge of the fluid separation chamber. An exemplary use for each of the fluid passages during a fluid separation procedure will be described in greater detail below.

Similar to the fluid separation chamber 144 of FIG. 7, the fluid separation chamber 184 of FIG. 8 may be used for either single- or multi-stage processing. When used for single-stage processing, a fluid is flowed into one of the stages (typically the first stage 196), where it is separated into at least two components. All or a portion of one or both of the components may then be flowed out of the first stage 196 and harvested or returned to the fluid source. When used for multi-stage processing, a fluid is flowed into the first stage 196 and separated into at least a first component and a second component. At least a portion of one of the components is then flowed into the second stage 198, where it is further separated into at least two sub-components. The component not flowed into the second stage 198 may be flowed out of the first stage 196 and harvested or returned to the fluid source. As for the sub-components, at least a portion of one or both may be flowed out of the second stage 198 for harvesting or return to the fluid source.

In an exemplary multi-stage fluid processing application, the fluid separation chamber 184 is used to separate whole blood into platelet-rich plasma and red blood cells in the first stage 196. The platelet-rich plasma is then flowed into the second stage 198, where it is separated into platelet concentrate and platelet-poor plasma. In the exemplary procedure, whole blood is flowed into the first stage 196 of a fluid separation chamber 184 received in a spinning centrifuge 10 (as in FIG. 1). The whole blood enters the first stage 196 via port 206 and the first fluid passage 204. The centrifugal field present in the fluid separation chamber 184 acts upon the blood to separate it into a layer substantially comprised of platelet-rich plasma and a layer substantially comprised of red blood cells. The higher density component (red blood cells) gravitates toward the high-G wall 24, while the lower density component (platelet-rich plasma) remains closer to the low-G wall 26 (FIG. 1). The red blood cells are flowed out of the first stage 196 via port 214 and the third fluid passage 212 (FIG. 8), where they are either harvested or returned to the blood source. The platelet-rich plasma is flowed out of the first stage 196 via port 210 and the second fluid passage 208. The high-G wall 24 may include a first projection or dam 228 which extends toward the low-G wall 26, across the second fluid passage 208. The first dam 228 is configured to intercept red blood cells adjacent thereto and prevent them from entering the second fluid passage 208 and thereby contaminating the platelet-rich plasma.

The platelet-rich plasma flowed out of the first stage 196 is directed into the second stage 198 by operation of one or more of the cassettes of the flow circuit. The platelet-rich plasma enters the second stage 198 via port 222 or port 226 and the associated fluid passage. The centrifugal field acts upon the platelet-rich plasma to separate it into a layer substantially comprised of platelet concentrate and a layer substantially comprised of platelet-poor plasma. The higher density component (platelet concentrate) gravitates toward the high-G wall 24, while the lower density component (platelet-poor plasma) remains closer to the low-G wall 26 (FIG. 1). The platelet concentrate is flowed out of the second stage 198 via port 218 and the fourth fluid passage 216 (FIG. 8), where it is either harvested or returned to the blood source. The platelet-poor plasma is flowed out of the second stage 198 via the remaining port (i.e., out of port 226 if the platelet-rich plasma entered the second stage 198 via port 222 or out of port 222 if the platelet-rich plasma entered the second stage 198 via port 226) and the associated fluid passage, where it is either harvested or returned to the blood source. The low-G wall 26 may include a second projection or dam 230 which extends toward the high-G wall 24, across the fourth fluid passage 216. The second dam 230 is configured to intercept platelet-poor plasma adjacent thereto and prevent it from entering the fourth fluid passage 216 and thereby diluting the platelet concentrate.

Figure 9:
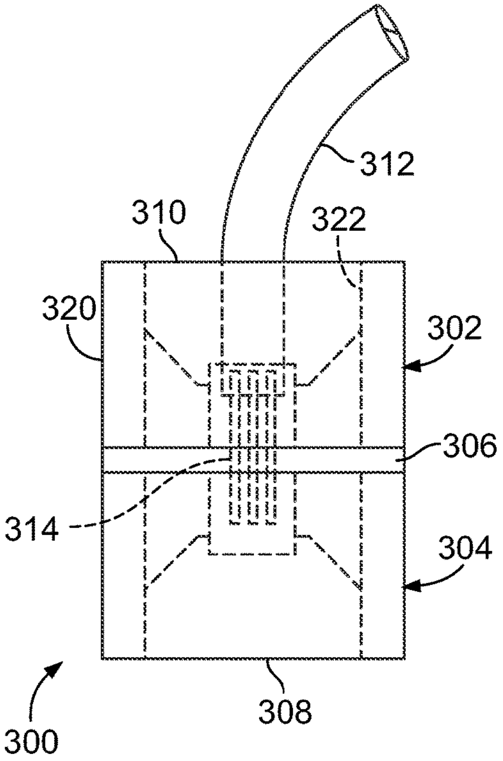
FIG. 9 is a side elevational view of an embodiment of a rigid fluid separation chamber that incorporates aspects of the present disclosure.
Figure 10:
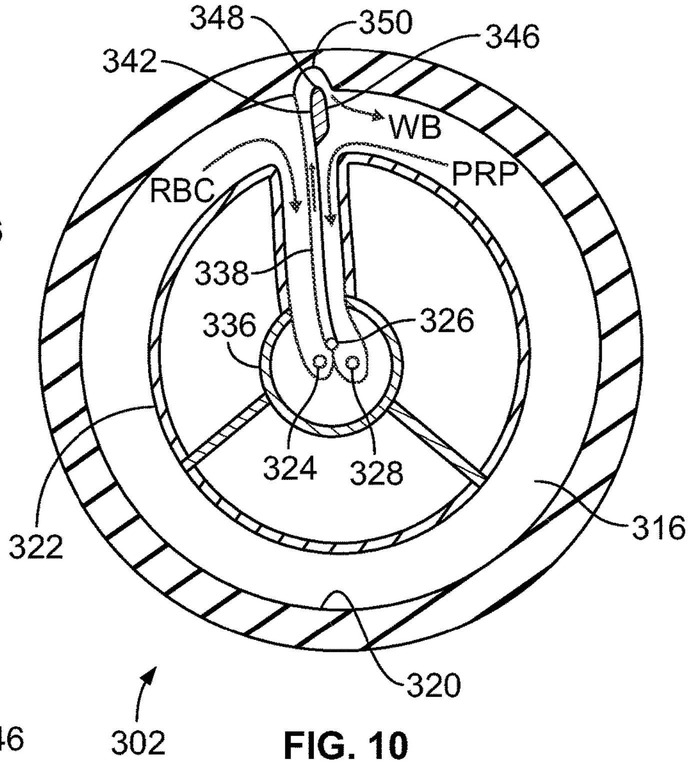
FIG. 10 is a bottom plan view of one of the stages of the fluid separation chamber of FIG. 9.
Figure 11:
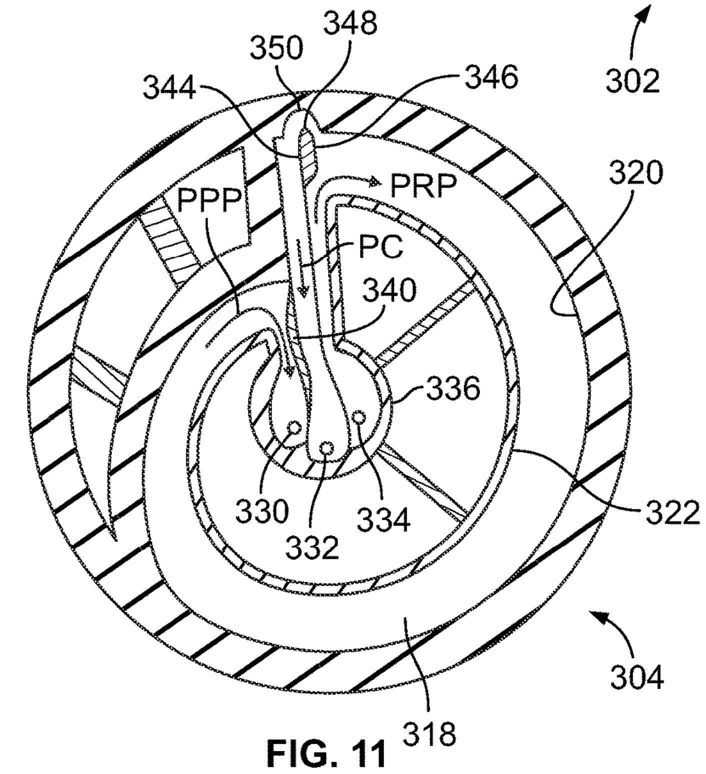
FIG. 11 is a top plan view of one of the stages of the fluid separation chamber of FIG. 9.

FIGS. 9-11 show another embodiment of a fluid separation chamber 300 according to the present disclosure. In one embodiment, the fluid separation chamber 300 of FIGS. 9-11 is a component of a disposable flow circuit, and the chamber 300 is preferably made of a generally rigid material. Such a flow circuit and fluid separation chamber 300 may be employed in combination with a variety of fluid processing devices including, but not limited to, a fluid processing device of the type currently marketed as the ALYX® blood separator by Fenwal, Inc. of Lake Zurich, Ill., which is an affiliate of Fresenius Kabi AG of Bad Homburg, Germany, as described in greater detail in U.S. Pat. Nos. 6,348,156; 6,875,191; 7,011,761; 7,087,177; 7,297,272; 7,708,710; and 8,075,468, all of which are hereby incorporated herein by reference. These devices find particular application in the separation of blood and/or blood components but, as noted above, apparatus and methods described herein are not limited to separation of a particular fluid and such a fluid processing device is merely exemplary.

The fluid separation chamber 300 may be preformed in a desired shape and configuration, e.g., by injection molding, from a rigid, biocompatible plastic material, such as a non-plasticized medical grade acrylonitrile-butadiene-styrene (ABS). In one embodiment, the fluid separation chamber 300 is comprised of separately formed or molded chambers or stages 302 and 304, which are connected together via a connection plate or member 306. In one configuration, the two chambers or stages are substantially identical, but it is within the scope of the present disclosure for the stages to be differently configured, such as one stage having more ports than the other stage or the ports of the stages being positioned at different angular positions about the central axis. In particular, it may be advantageous for each stage to be specially configured for the fluid separation expected to take place therein, such that it may be preferable for the stages 302 and 304 to be differently configured, as shown in FIGS. 10 and 11, if the separation needs of each are different.

The chambers and the connection member may be comprised of different or similar materials, although it may be advantageous for them to be comprised of the same material to simplify affixation of the chambers 302 and 304 to the connection member 306. For example, if the chambers 302 and 304 and the connection member 306 are all molded of the same heat-bondable plastic material, the chambers 302 and 304 may be ultrasonically welded to the connection member 306. In other embodiments, the fluid separation chamber 300 may be composed of different elements or may be provided as a single, integrally formed component.

The fluid separation chamber 300 may be generally cylindrical, with a bottom end surface or edge 308 and a top end surface or edge 310 (FIG. 9). The terms “top” and “bottom” are used for reference only and the end surfaces or edges may be disposed in other positions without departing from the scope of the present disclosure. Either end of the fluid separation chamber 300 may be configured to connect with tubing to allow for fluid communication between the interior of the fluid separation chamber 300 and another portion of the associated flow circuit. At least some of the tubing leading into the fluid separation chamber 300 may be bundled together or formed as a single tubing construct in the form of an umbilicus 312 comparable to the umbilicus 74 of FIG. 1. Whichever end of the chamber 300 is connected to the tubing may be otherwise closed to ensure that fluid passage into and out of the fluid separation chamber 300 occurs only via the tubing. For the same reason, a cover or lid (not illustrated) may be secured to the other end of the fluid separation chamber 300.

According to an aspect of the present disclosure, the fluid separation chamber 300 is provided with separate first and second stages which are positioned at different axial locations with respect to the rotational axis of a centrifuge assembly into which the fluid separation chamber 300 is loaded for use. As used herein, the terms “first” and “second” are merely denominational and are not meant to imply or require a particular order of operation or fluid flow. For example, while fluid separation methods will be described herein in which fluid first flows into the first stage and then into the second stage, it is within the scope of the present disclosure for fluid to first flow into the second stage and then from the second stage into the first stage. Further, additional stages and/or chambers may also be employed without departing from the scope of the present disclosure.

In one embodiment, the first or upper stage 302 (shown in greater detail in FIG. 10) is positioned adjacent to the top end or surface 310 of the fluid separation chamber 300 and the second or lower stage 304 (shown in greater detail in FIG. 11) is positioned therebelow, such as adjacent to the bottom end or surface 308 of the fluid separation chamber 300. In another embodiment, the first stage may be positioned adjacent to the bottom end or surface 308, with the second stage positioned thereabove, such as adjacent to the top end or surface 310. Any of a variety of means may be provided for separating the stages 302 and 304 but, in the illustrated embodiment, the connection member 306 serves as an interior wall positioned between the stages 302 and 304 to separate them. As will be described in greater detail herein, it may be advantageous for one or more fluids and/or fluid components to flow from one stage to the other, so the interior wall may have at least one flow path 314 therethrough or be provided with some other means for transferring fluid or a fluid component between the first and second stages 302 and 304.

Each stage includes a processing channel (labeled at 316 in FIG. 10 and at 318 in FIG. 11) defined between an outer or high-G wall 320 and an inner or low-G wall 322 and including at least one fluid inlet and at least one fluid outlet, with selected inlets and outlets being in flow communication association with tubes or flow paths of the umbilicus 312 (FIG. 9). The processing channels 316 and 318 may be the same or differently configured. For example, the processing channel 316 of FIG. 10 is shown as being generally annular (i.e., having a generally uniform radius about the central axis of the fluid separation chamber 300), while the processing channel 318 of FIG. 11 is shown as being generally spiral-shaped (i.e., having a non-uniform radius about the central axis of the fluid separation chamber 300). In other embodiments, the processing channel 316 may be generally spiral-shaped, with the processing channel 318 being generally annular, or both processing channels 316 and 318 could be generally annular or generally spiral-shaped. Other channel configurations may also be employed without departing from the scope of the present disclosure.

In the illustrated embodiment, the first stage 302 and the second stage 304 are each provided with a plurality of ports, the number of which may depend on the desired application. In the illustrated embodiment, the first stage 302 includes three ports (respectively referred to herein as the first, second, and third ports and labeled as 324, 326, and 328 in FIG. 10) while the second stage 304 also includes three ports (respectively referred to herein as the fourth, fifth, and sixth ports and labeled as 330, 332, and 334 in FIG. 11). The ports are shown as being generally centrally located within the chamber 300 (i.e., associated with a central hub 336 at or adjacent to the central axis of the chamber 300), with generally radial flowpaths connecting each to the associated channel; however, the ports may be positioned at other locations without departing from the scope of the present disclosure.

In an exemplary flow configuration shown in FIG. 10, the second port 326 serves as an inlet for fluid entering into the first stage 302, while the first and third ports 324 and 328 serve as outlets for fluid exiting the first stage 302. In an exemplary flow configuration shown in FIG. 11, the sixth port 334 serves as an inlet for fluid entering into the second stage 304, while the fourth and fifth ports 330 and 332 serve as outlets for fluid exiting the second stage 304. The flow configurations of FIGS. 10 and 11 are merely exemplary and other flow configurations (e.g., a flow configuration in which the fourth port 330 is a fluid inlet of the second stage 304, with the fifth and sixth ports 332 and 334 being fluid outlets) may also be employed without departing from the scope of the present disclosure.

The illustrated channels 316 and 318, respectively, of the stages 302 and 304 include a terminal wall 338 (for the first stage 308) and 340 (for the second stage 310) to interrupt and prevent fluid flowing further circumferentially through the stage. The terminal walls 338 and 340 define an end to the channels, with a fluid inlet in proximity or adjacent to one side of the terminal wall and at least one associated fluid outlet in proximity or adjacent to the other side of the terminal wall. The illustrated terminal walls 338 and 340 are merely exemplary and other configurations may also be employed, including open, continuous channels, such as those that extend fully around the chamber, without departing from the scope of the present disclosure.

In the illustrated embodiment, each stage includes an additional interior wall or surface, which extends into the associated channel and is positioned between two ports of the stage. The interior wall positioned in the first stage 302 is referred to herein as the first barrier 342, while the interior wall positioned in the second stage 304 is referred to herein as the second barrier 344. The barriers 342 and 344, if provided, serve to separate two ports, such as adjoining or adjacent ports 326 and 328, which helps to divert fluid flow through the stage and decrease contamination of the separated fluid components (e.g., reducing the presence of a low-G component in a high-G component outlet port or a high-G component in a low-G component outlet port).

The exact configurations of the barriers may vary without departing from the scope of the present disclosure. In the embodiments of FIGS. 10 and 11, each barrier 342 and 344 is shown as being generally rectangular, with a generally flat radial portion 346 facing away from the terminal wall 338, 340 and an arcuate or semi-circular outer edge 348 facing the high-G wall 320. The high-G wall 320 may have an outward pocket or indentation 350 in the vicinity of the barrier 342, 344 to allow for a larger barrier without unduly restricting flow between the second port 326 (FIG. 10) or fifth port 332 (FIG. 11) and the associated channel.

The fluid separation chamber 300 may be used for either single- or multi-stage processing. When used for single-stage processing, a fluid is flowed into one of the stages, where it is separated into at least two components. All or a portion of one or both of the components may then be flowed out of the stage and harvested or returned to the fluid source. When used for multi-stage processing, for example, a fluid is flowed into one of the stages (e.g., the first stage 302) and separated into at least a first component and a second component. At least a portion of one of the components is then flowed into the other stage (e.g., the second stage 304), where it may be further separated into at least two sub-components. The component(s) not flowed into the second stage 304 may be flowed out of the first stage 302 and harvested or returned to the fluid source. As for the sub-components, at least a portion of one or both may be flowed out of the second stage 304 for harvesting or return to the fluid source.

The stages 302 and 304 are separate from each other but, as noted above, fluid may be passed therebetween from an outlet of one of the stages to an inlet of the other stage. In the flow configuration of FIGS. 10 and 11, the third port 328 (which serves as the outlet for a fluid component concentrated along the radial inner or low-G wall 322 from the first stage 302) and the sixth port 334 (which serves as the fluid inlet for the second stage 304) are fluidly connected. The fluidly communicative ports of the first and second stages 302 and 304 may be connected by any of a variety of means. In one embodiment, the connection member 306 may include an integrally formed flow path 314 which connects the fluidly communicative ports of the stages. Other embodiments may use different means for transferring fluid between the stages, such as flexible tubing extending directly between the stages. It is also within the scope of the present disclosure for a separated fluid component to exit the first stage 302, travel to a location outside of the fluid separation chamber 300 via one lumen of the umbilicus 312, before returning to the second stage 304 via another lumen of the umbilicus 312. In such an embodiment, the umbilicus 312 may be provided with one lumen for each of the ports of the fluid separation chamber 300.

In other embodiments, rather than transferring fluid from the first or upper stage 302 to the second or lower stage 304, fluid may instead be transferred from the second or lower stage 304 to the first or upper stage 302. The above-described methods of fluidly connecting the upper and lower stages apply regardless of whether fluid is transferred from the upper stage to the lower stage or from the lower stage to the upper stage. It is further within the scope of the present disclosure for fluid to be transferred back and forth between the stages, such as from the upper stage to the lower stage and then back to the upper stage or from the lower stage to the upper stage and then back to the lower stage. The fluid or component may also flow in different directions in different stages, such as clockwise in the first stage 302 and counterclockwise in the second stage 304, or vice versa.

In an exemplary multi-stage fluid processing application, the fluid separation chamber 300 is used to separate whole blood ("WB") into platelet-rich plasma ("PRP") and concentrated red blood cells ("RBC") in the first stage 302 (FIG. 10). The platelet-rich plasma is then flowed into the second stage 304, where it is separated into platelet concentrate ("PC") and platelet-poor plasma ("PPP").

In an exemplary procedure, whole blood is flowed into the first stage 302 of a fluid separation chamber 300 received in a spinning centrifuge. The whole blood enters the first stage 302 via the second port 326. The centrifugal field present in the fluid separation chamber 300 acts upon the blood to separate it into a layer substantially comprised of platelet-rich plasma and a layer substantially comprised of red blood cells. The higher density component (i.e., red blood cells) sediments toward the high-G wall 320 of the fluid separation chamber 300, while the lower density component (i.e., platelet-rich plasma) remains closer to the low-G wall 322.

In the illustrated flow configuration (FIG. 10), the separated red blood cells traverse the entire length of the channel 316 to exit the first stage 302 via the first port 324, where they may be harvested for storage and subsequent use or returned to the blood source. The platelet-rich plasma reverses direction (to move counterclockwise in the orientation of FIG. 10) and exits via the third port 328. The platelet-rich plasma flowed out of the first stage 302 is directed into the second stage 304 via the sixth port 334 using tubing or an integrally formed flow path or the like. The platelet-rich plasma flows along the second stage 304 (in a clockwise direction in the illustrated flow configuration) while the centrifugal field acts to separate the platelet-rich plasma into a layer substantially comprised of platelet concentrate ("PC") and a layer substantially comprised of platelet-poor plasma ("PPP") (FIG. 11). The higher density component (platelet concentrate) sediments toward the high-G wall 320, while the lower density component (platelet-poor plasma) remains closer to the low-G wall 322. The platelet-poor plasma is flowed out of the second stage 304 via the fourth port 330, where it may be harvested or returned to the blood source. The platelet concentrate reverses flow to exit the second stage 304 via the fifth port 332, where it may be harvested or returned to the blood source.

The stages shown in FIGS. 10 and 11 are merely exemplary, and other configurations may be employed without departing from the scope of the present disclosure. For example, FIGS. 12-14 and 16-17 illustrate additional exemplary configurations for stages of a rigid fluid separation chamber of the type shown in FIG. 9. The stages of FIGS. 12-14 and 16-17 may be particularly advantageous for use as the second stage of a two-stage fluid separation chamber or as the only stage of a single-stage fluid separation chamber, but they are not so limited and may be used in other contexts (e.g., as the first stage of a two-stage fluid separation chamber) without departing from the scope of the present disclosure.

Figure 12:
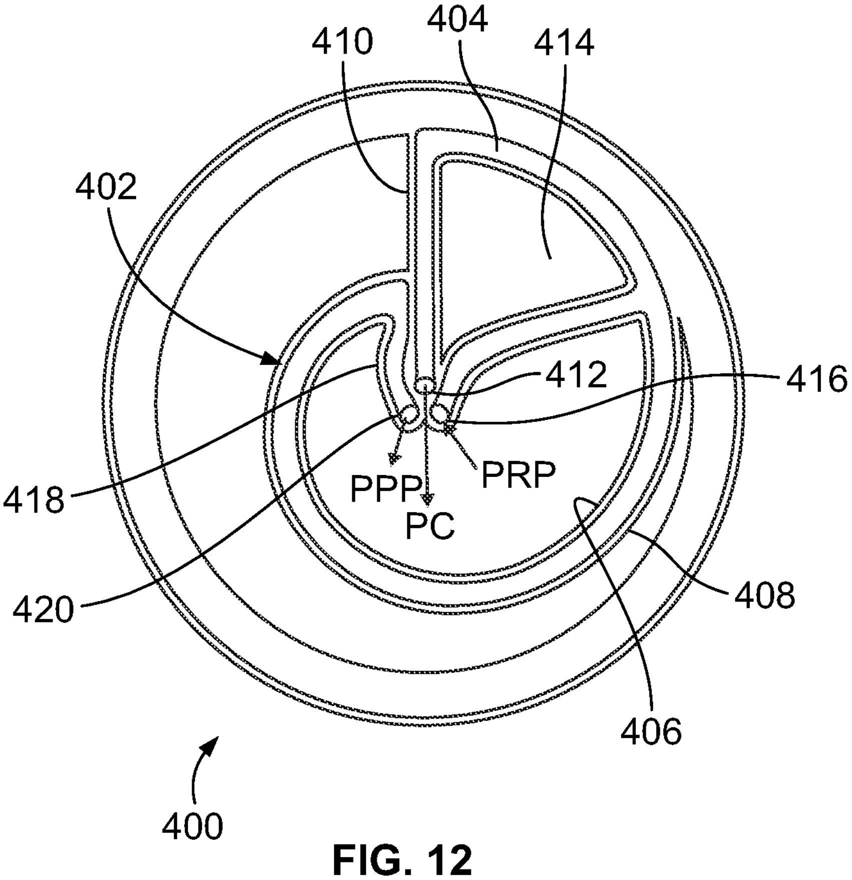
FIG. 12 is a top plan view of an alternative embodiment of a rigid fluid separation chamber according to an aspect of the present disclosure.

FIG. 12 shows a rigid fluid separation chamber 400 defining a stage 402. The stage 402 includes a channel 404 defined between a low-G wall 406 and a high-G wall 408, which is illustrated with a radius which varies about the rotational axis of the chamber 400. The stage 402 is provided with a first flow path 410 extending between the channel 404 and an associated first port 412, a second flow path 414 and associated second port 416 positioned clockwise of the first flow path 410, and a third flow path 418 and associated third port 420 positioned clockwise of the second flow path 414. In the illustrated embodiment, the first and third flow paths 410 and 418 are configured to join the channel 404 at approximately the same angular location, with the second flow path 414 joining the channel 414 at an angle from the first flow path 410. While FIG. 12 shows a stage 402 having only one flow path positioned between the first and third flow paths 410 and 418, there may be more than one intermediate flow path.

Figure 13:
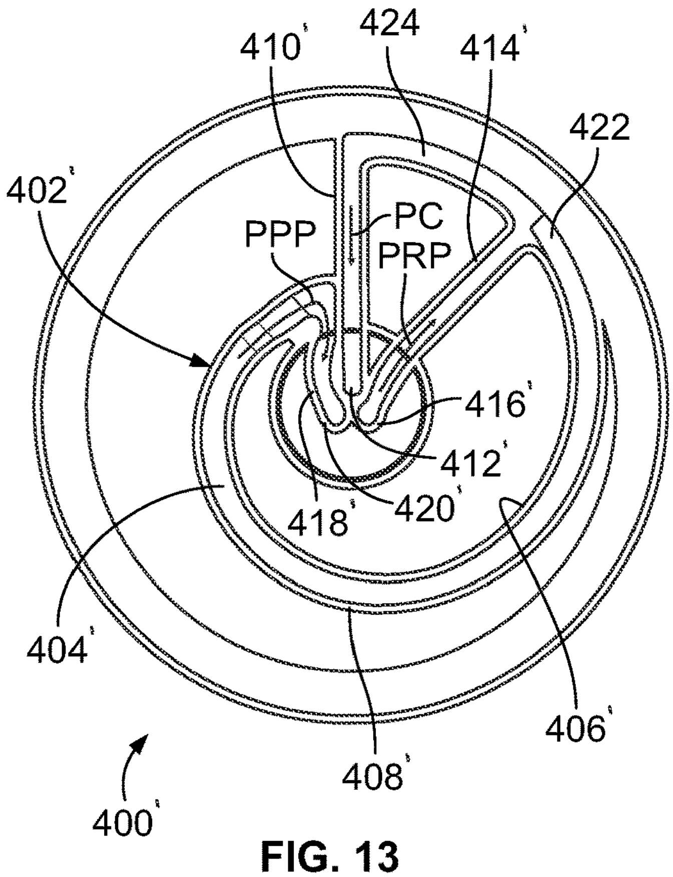
FIG. 13 is a top plan view of another embodiment of a rigid fluid separation chamber according to the present disclosure.
Figure 14:
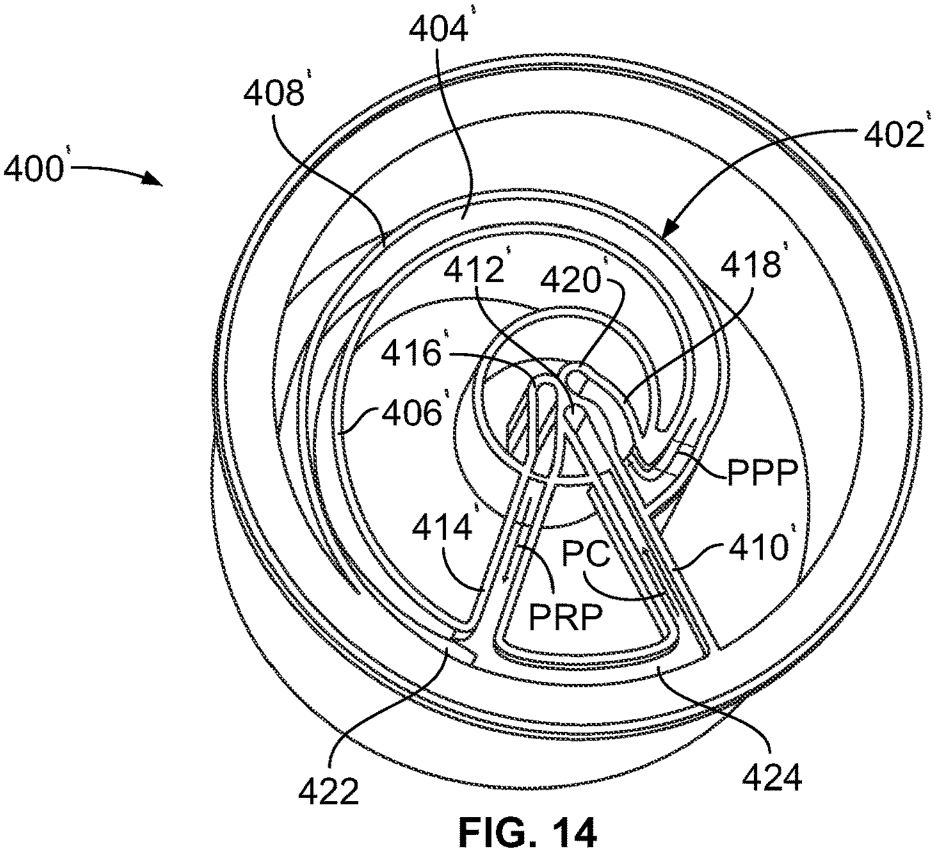
FIG. 14 is a perspective view of the fluid separation chamber of FIG. 13.

The angular position at which the second flow path 414 joins the channel 404 may vary. In the embodiment of FIG. 12, the second flow path 414 joins the channel 404 at a position approximately 75° clockwise of the first flow path 410. In a similar embodiment shown in FIGS. 13-14 (in which chamber elements corresponding to chamber elements of FIG. 12 are labeled with the same reference number appended with an apostrophe), the chamber 400' has a stage 402' in which the second flow path 414' joins the channel 404' at a position approximately 45° clockwise of the first flow path 410'. In the embodiments of FIGS. 12-14, the channel 404, 404' is substantially spiral-shaped, such that the radius of the channel 404, 404' about the rotational axis of the chamber 400, 400' varies. Accordingly, varying the angular location at which the second flow path 414, 414' or any of the other flow paths joins the channel 404, 404' will vary the radial position at which that flow path joins the channel 404, 404'. In the embodiments of FIGS. 12-14, the channel 404, 404' has a maximum radius at the location where it is intersected by the first flow path 410, 410' and a minimum radius at the location where it is intersected by the third flow path 418, 418', with the radius decreasing from the former to the latter. Accordingly, an intersection point of the channel 404, 404' and the second flow path 414, 414' positioned at a greater angle from the intersection point of the first flow path 410, 410' and the channel 404, 404' (as in FIG. 12) will be at a smaller radial position than an intersection point positioned at a smaller angle from the intersection point of the first flow path 410, 410' and the channel 414, 414' (as in FIGS. 13 and 14). Depending on the contour of the channel, the radial position of the second flow path 414, 414' (i.e., the radius of the channel 404, 404' at the point where the second flow path 414, 414' intersects the channel 404, 404') may even be substantially the same as the radial position of the first flow path 410, 410', as in FIGS. 13 and 14.

Figure 15:
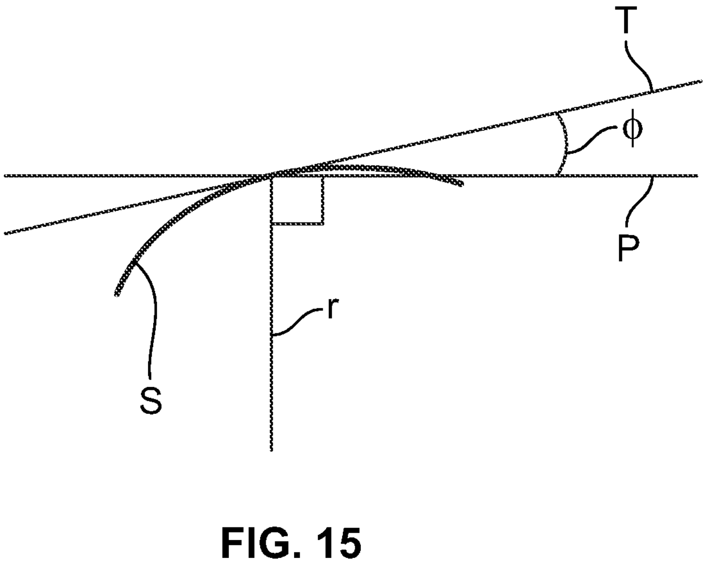
FIG. 15 is a diagrammatic view of a portion of a spiral which may describe all or a portion of a fluid separation gap or channel according to the present disclosure.

The exact curvature of the spiral-shaped channel may vary without departing from the scope of the present disclosure. Each point of a spiral "S" describing the shape of the channel (or a portion of the channel) may be characterized as having a pitch angle $\phi$ (FIG. 15), which is the angle between a line "T" tangent to the spiral "S" at that point and a line "P" perpendicular to the radial line "r" of the spiral "S" at that point. In one embodiment, the entire spiral (and, hence, the entire channel) is logarithmic, with a pitch angle $\phi$ having a constant, non-zero value. In other embodiments, the spiral may have a pitch angle which varies. For example, the pitch angle may increase in one direction (e.g., from a relatively small pitch angle at the intersection point between the first flow path 410, 410' and the channel 404, 404' to a relatively large pitch angle at the intersection point between the third flow path 418, 418' and the channel 404, 404'), varying either continuously or non-continuously. In another embodiment, the pitch angle may decrease in one direction (e.g., from a relatively large pitch angle at the intersection point between the first flow path 410, 410' and the channel 404, 404' to a relatively small pitch angle at the intersection point between the third flow path 418, 418' and the channel 404, 404'), varying either continuously or non-continuously. In yet another embodiment, the spiral/channel may have a number of inflection points as it passes from the first flow path 410, 410' to the third flow path 418, 418', with a pitch angle which may change between varying in one direction (e.g., increasing) and then another direction (e.g., decreasing) one or more times. In other embodiments, the channel may be spiral-shaped over only a portion of its extent, with one or more other portions of its extent being defined by different contours (e.g., an annular contour having a pitch angle of zero). The same is true for any other spiral-shaped gaps/channels according to the present disclosure.

In one embodiment, the stage 402, 402' of the rigid chambers 400, 400' of FIGS. 12-14 are provided as second stages of dual-stage fluid processing systems, which may be used to separate PRP into PPP and PC, similar to the above description of the second stage 304 of FIG. 11. In such a flow configuration, PRP may flow into the stage 402, 402' via the second flow path 414, 414', thereby entering the channel 404, 404' at a radial location no greater than that of the first flow path 410, 410' and no less than that of the third flow path 418, 418'. The rotating chamber 400, 400' separates the PRP into more dense PC and less dense PPP, with the PC moving toward the high-G wall 408, 408' of the channel 404, 404' and the PPP moving toward the low-G wall 406, 406'. The PC moves toward the region of maximum radius in the channel 404, 404', which is at the first flow path 410, 410', while the PPP moves toward the region of minimum radius in the channel 404,404', which is at the third flow path 418, 418'. Hence, the PC moves in a counter-clockwise direction in the channel 404, 404' from the second flow path 414, 414' to the first flow path 410, 410' as the PPP moves in a clockwise direction in the channel 404, 404' from the second flow path 414, 414' to the third flow path 418, 418'. While such a flow configuration may be suitable for separating PPP and PC from PRP, other flow configuration may also be employed without departing from the scope of the present disclosure. For example, either the first flow path 410, 410' or the third flow path 418, 418' may be used as a fluid inlets into the channel 404, 404' instead of fluid outlets from the channel 404, 404'.

In one embodiment, the axial height of the channel may vary, as best illustrated in FIG. 14. If the separation between the low- and high-G walls 406' and 408' of the channel 404' remains generally constant, along with the position of either the top or bottom surface of the channel 404', varying the location of the other top/bottom surface changes the cross-sectional area of the channel 404'. For example, if the position of the top surface of the channel 404' remains fixed (which is the case if the top of the channel 404' is covered by a flat lid or plate), positioning the bottom surface of the channel 404' relatively close to the top surface will result in the channel 404' having a relatively small cross-sectional area in that location. Conversely, positioning the bottom surface of the channel 404' relatively far from the top surface will result in the channel 404' having a relatively large cross-sectional area in that location. In other embodiments, the position of the bottom surface may remain fixed, while the axial position of the top surface may vary in order to give the channel 404' a non-uniform cross-sectional area.

In the embodiment of FIGS. 13 and 14, at least part of the bottom surface of the channel 404' is defined by a ramped or inclined portion 422, with a non-uniform axial height along its angular extent. More particularly, the illustrated ramped portion 422 has a relatively small axial height (i.e., the bottom surface is positioned relatively far from the top surface of the channel 404') at or adjacent to the third flow path 418' and a relatively large axial height (i.e., the bottom surface is positioned relatively close to the top surface of the channel 404') at or adjacent to the second flow path 414'. The bottom surface of the illustrated channel 404' has a flat or non-ramped portion 424 extending between the first flow path 410' and the second flow path 414', giving the channel 404' a uniform cross-sectional area in that region. In other embodiments, the ramped portion 422 may occupy a different angular extent of the channel 404', up to occupying the entire angular extent of the channel 404', from the first flow path 410' to the third flow path 418'. Furthermore, while the illustrated ramped portion 422 has a height which varies in only one direction, it is also within the scope of the present disclosure to provide a ramped portion with an axial height which increases and then decreases (or vice versa) one or more times along its angular extent. Additionally, a channel may also be provided with a plurality of ramped portions.

If provided, a channel having a non-uniform cross-sectional area will result in a varying flow speed. In particular, there will be a higher flow rate in regions of the channel having a relatively small cross-sectional area and a lower flow rate in regions of the channel having a relatively large cross-sectional area. Hence, when the chamber 400' of FIGS. 13 and 14 is used to separate PRP into PC and PPP (as shown in the illustrated flow configuration), the PC will move at a relatively high flow rate through a channel region 424 having a relatively small cross-sectional area (i.e., from the second flow path 414' to the first flow path 410'), while the PPP will move at a relatively slow (and decreasing) flow rate through a channel region 422 having an increasing cross-sectional area (i.e., from the second flow path 414' to the third flow path 418'). Flowing the PC at a greater rate than the PPP tends to lift the platelets away from the plasma, thereby ensuring that the plasma remains platelet-free while fluidizing the platelets. Although not illustrated, the channels of FIG. 10-12 may be provided with a ramped section or some other feature or configuration to give them a non-uniform cross-sectional area along their angular extent.

Figure 16:
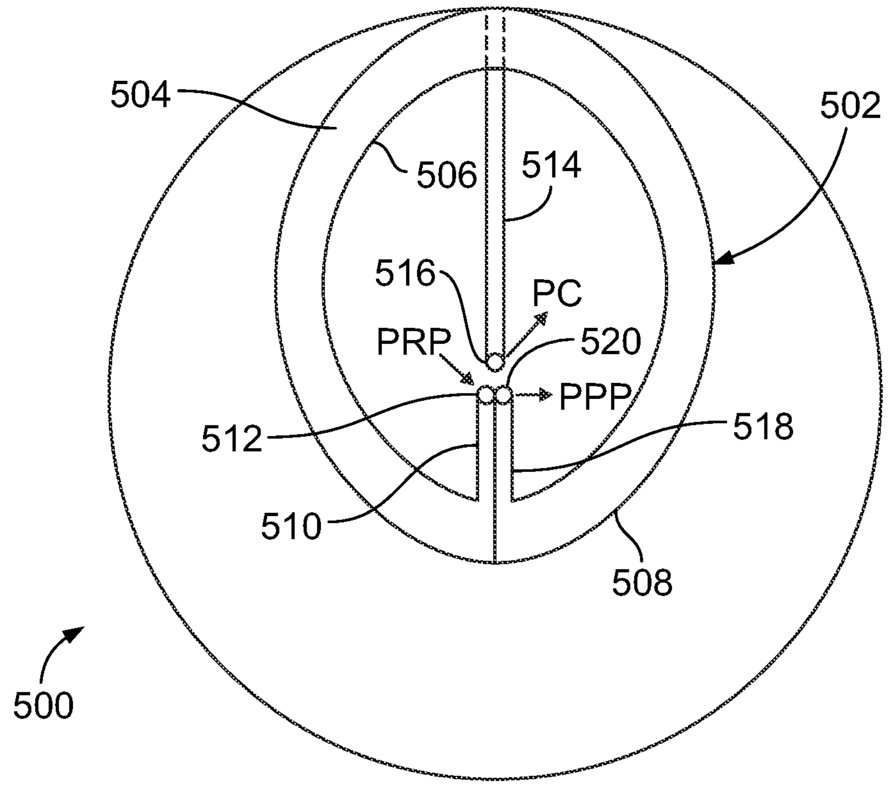
FIG. 16 is a top plan view of another embodiment of a rigid fluid separation chamber according to the present disclosure.
Figure 17:
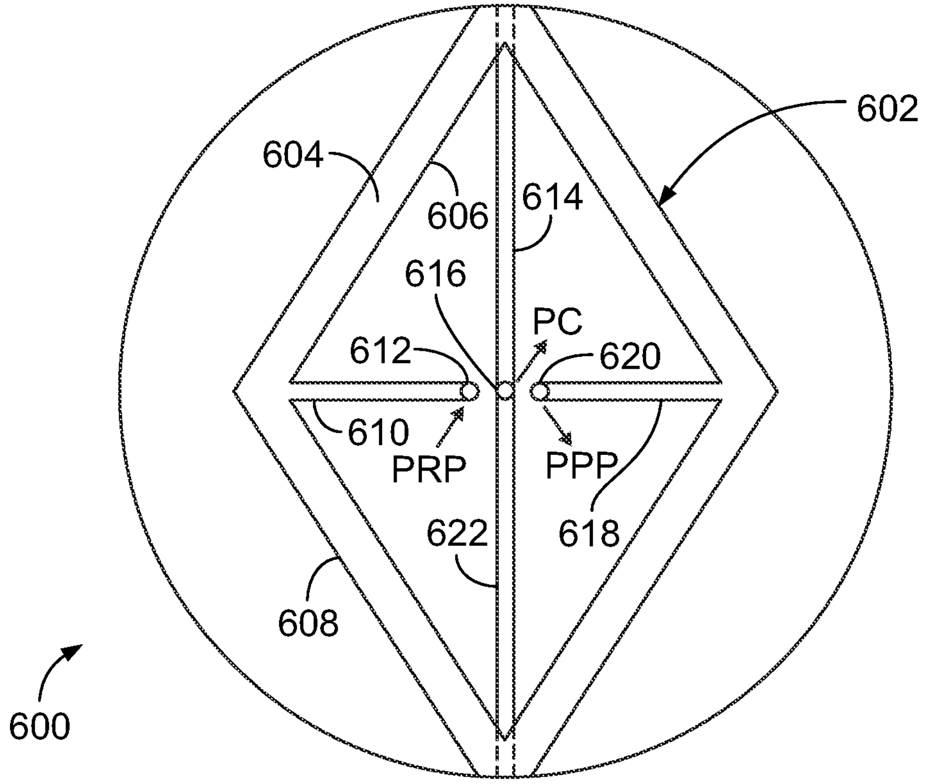
FIG. 17 is a top plan view of an alternative embodiment of a rigid fluid separation chamber according to the present disclosure.

FIGS. 16 and 17 illustrate additional embodiments of rigid chamber bodies according to the present disclosure. In these embodiments, the fluid to be separated does not flow into the channel at an intermediate radial location (as in the embodiments of FIGS. 11 and 12), but at a region of maximum (FIG. 16) or minimum radius (FIG. 17). In FIG. 16, a rigid chamber 500 with a single stage 502. The single stage 502 may be used independently of any other separation stages, as the first stage of a dual-stage fluid processing system, or as the second stage of a dual-stage fluid processing system. The stage 502 of FIG. 16 includes a channel 504 defined between a low-G wall 506 and a high-G wall 508, with the channel 504 being illustrated as having a radius which varies about the rotational axis of the chamber 500. The stage 502 may be provided with a first flow path 510 extending between the channel 504 and an associated first port 512, a second flow path 514 and associated second port 516 positioned clockwise of the first flow path 510, and a third flow path 518 and associated third port 520 positioned clockwise of the second flow path 514. In the illustrated embodiment, the first and third flow paths 510 and 518 are configured to join the channel 504 at approximately the same angular location, with the second flow path 514 joining the channel 504 at an angle from the first flow path 510. While FIG. 16 shows a stage 502 having only one flow path positioned between the first and third flow paths 510 and 518, there may be more than one intermediate flow path.

The second flow path 514 is positioned so as to intersect the channel 504 at or adjacent to the region of maximum radius. In the embodiment of FIG. 16, the region of maximum radius of the channel 504 is approximately 180° from the first and third flow paths 510 and 518, but in other embodiments, the region of maximum radius may be located at a different angle from the first flow path 510. For example, FIG. 17 (which will be described in greater detail herein) illustrates a stage in which a region of maximum radius is approximately 90° from the first flow path thereof. Other channel configurations may also be employed without departing from the scope of the present disclosure.

In the embodiment of FIG. 16, the channel 504 is substantially symmetrical clockwise and counter-clockwise of the maximum radius location. In other words, the region of the channel 504 from the first flow path 510 to the second flow path 514 is a mirror image of the region of the channel 504 from the second flow path 514 to the third flow path 518. In particular, the first and third flow paths 510 and 518 are positioned to intersect the channel 504 at or adjacent to a minimum radius location, with the radius of the channel 504 increasing (in both the clockwise and counter-clockwise directions) from that location to the maximum radius location of the channel 504, where the channel 504 is intersected by the second flow path 514. In other embodiments, the channel may be non-symmetrical about the maximum radius location. The exact curvature of the channel and individual sections thereof, if provided as a spiral, may be variously provided, in accordance with the above description of the spiral of FIG. 15.

In one embodiment, the stage 502 of the rigid chamber 500 of FIG. 16 is provided as the second stage of a dual-stage fluid processing system, which may be used to separate PRP into PPP and PC. In such a flow configuration, PRP flows into the stage 502 via the first flow path 510, thereby entering the channel 504 at a relatively low or minimum radial location. The rotating chamber 500 separates the PRP into more dense PC and less dense PPP, with the PC moving toward the high-G wall 508 of the channel 504 and the PPP moving toward the low-G wall 506. The PC moves in a clockwise direction through the channel 504, along the high-G wall 508 until it moves into the vicinity of the second flow path 514, which intersects the channel 504 at or adjacent to the region of maximum radius. The PPP also moves in a clockwise direction through the channel 504, but along the low-G wall 506, thereby bypassing the second flow path 514 without exiting the channel 504. The PPP eventually reaches the third flow path 518, which is positioned at a relatively low or minimum radial location, where it exits the channel 504. While such a flow configuration may be suitable for separating PPP and PC from PRP, other flow configuration may also be employed without departing from the scope of the present disclosure. For example, either the second flow path 514 or the third flow path 518 may be used as a fluid inlets into the channel 504 instead of fluid outlets from the channel 504.

FIG. 17 is another embodiment of a rigid chamber 600 with a single stage 602. The single stage 602 may used independently of any other separation stages, as the first stage of a dual-stage fluid processing system, or as the second stage of a dual-stage fluid processing system.

The stage 602 of FIG. 17 includes a channel 604 defined between a low-G wall 606 and a high-G wall 608, with the channel 604 being illustrated as having a radius which varies about the rotational axis of the chamber 600. Rather than varying along a smooth or relatively smooth curve, the channel 604 of FIG. 17 is shown as being comprised of a plurality of linear or generally linear segments. Any of the other chambers described herein may employ a channel/gap comprised of at least one linear or generally linear segment, just as the chamber 600 of FIG. 17 may be comprised of one or more smoothly or relatively smoothly curved segments.

The stage 602 is provided with a first flow path 610 extending between the channel 604 and an associated first port 612, a second flow path 614 and associated second port 616 positioned clockwise of the first flow path 610, a third flow path 618 and associated third port 620 positioned clockwise of the second flow path 614, and a fourth flow path 622 associated with the second port 616 and positioned clockwise of the third flow path 618. In the illustrated embodiment, each flow path is positioned approximately 90° away from the adjacent flow paths, but flow paths being differently spaced from the adjacent flow paths may also be employed without departing from the scope of the present disclosure.

The second and fourth flow paths 614 and 622 are positioned at or adjacent to regions of the channel 604 having a maximum radius. In the embodiment of FIG. 17, the regions of maximum radius of the channel 604 are approximately 90° from the first and third flow path 610 and 618, but in other embodiments, the region(s) of maximum radius may be a different angle from the first flow path 610.

In the embodiment of FIG. 17, the channel 604 is substantially symmetrical, with the left and right halves being mirror images and the upper and lower halves (in the orientation of FIG. 17) being mirror images. In particular, the first and third flow paths 610 and 618 are positioned at or adjacent to minimum radius locations of the channel 604, with the radius of the channel 604 increasing from these locations to the maximum radius locations of the channel 604, where the channel 604 is intersected by the second and fourth flow paths 614 and 622. In other embodiments, the channel may be non-symmetrical.

In one embodiment, the stage 602 of the rigid chamber 600 of FIG. 17 is provided as the second stage of a dual-stage fluid processing system, which may be used to separate PRP into PPP and PC. In such a flow configuration, PRP flows into the stage 602 via the first flow path 610, thereby entering the channel 604 at a relatively low or minimum radial location. The rotating chamber 600 separates the PRP into more dense PC and less dense PPP, with the PC moving toward the high-G wall 608 of the channel 604 and the PPP moving toward the low-G wall 606. A portion of the PC and the PPP may move in a clockwise direction from the first flow path 610 toward the second flow path 614), while another portion of the PC and PPP may move in a counter-clockwise direction from the first flow path 610 toward the fourth flow path 622. The PC moves through the channel 604 along the high-G wall 608 until it moves into the vicinity of the second flow path 614 (if moving clockwise through the channel 604) or the fourth flow path 622 (if moving counter-clockwise through the channel 604), which are fluidly connected to the high-G wall 608 of the channel 604 at or adjacent to the regions of maximum radius. In either case, the PC exits the channel 604 via the flow path in that region and thereafter exits the chamber 600 via the associate second port 616. The PPP also moves through the channel 604, but along the low-G wall 606, thereby bypassing the second flow path 614 (if moving clockwise through the channel 604) or the fourth flow path 622 (if moving counter-clockwise through the channel 604) without exiting the channel 604. The PPP eventually reaches the third flow path 620, which is positioned at a relatively low or minimum radial location, where it exits the channel 604. While such a flow configuration may be suitable for separating PPP and PC from PRP, other flow configuration may also be employed without departing from the scope of the present disclosure.

The concepts illustrated in FIGS. 11-17 (i.e., the use of fluid separation stages having a non-uniform diameter about the rotational axis) are not limited to rigid fluid separation chambers, but may also be incorporated into systems for flexible fluid separation chambers. For example, FIG. 18 illustrates an embodiment of a gap or channel or centrifugation field configuration for use with a flexible-body chamber, with the gap or channel or centrifugation field being defined by the combination of a spool and bowl (as has been described above with reference to the centrifuge 10 of FIG.

1) or by any other suitable means. FIG. 19 illustrates a stage of an exemplary flexible-body chamber which may be used in combination with the gap or channel configuration of FIG. 18 for a structure and function which are comparable to those of the rigid chambers 500 and 600 of FIGS. 16 and 17.

Figure 18:
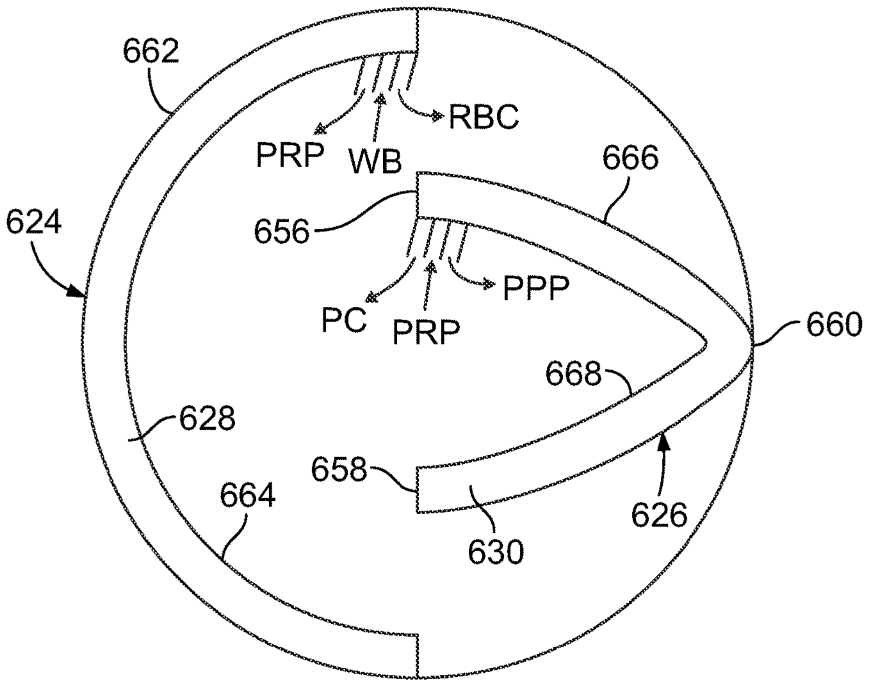
FIG. 18 is a top plan view of a gap configuration embodying aspects of the present disclosure.
Figure 19:
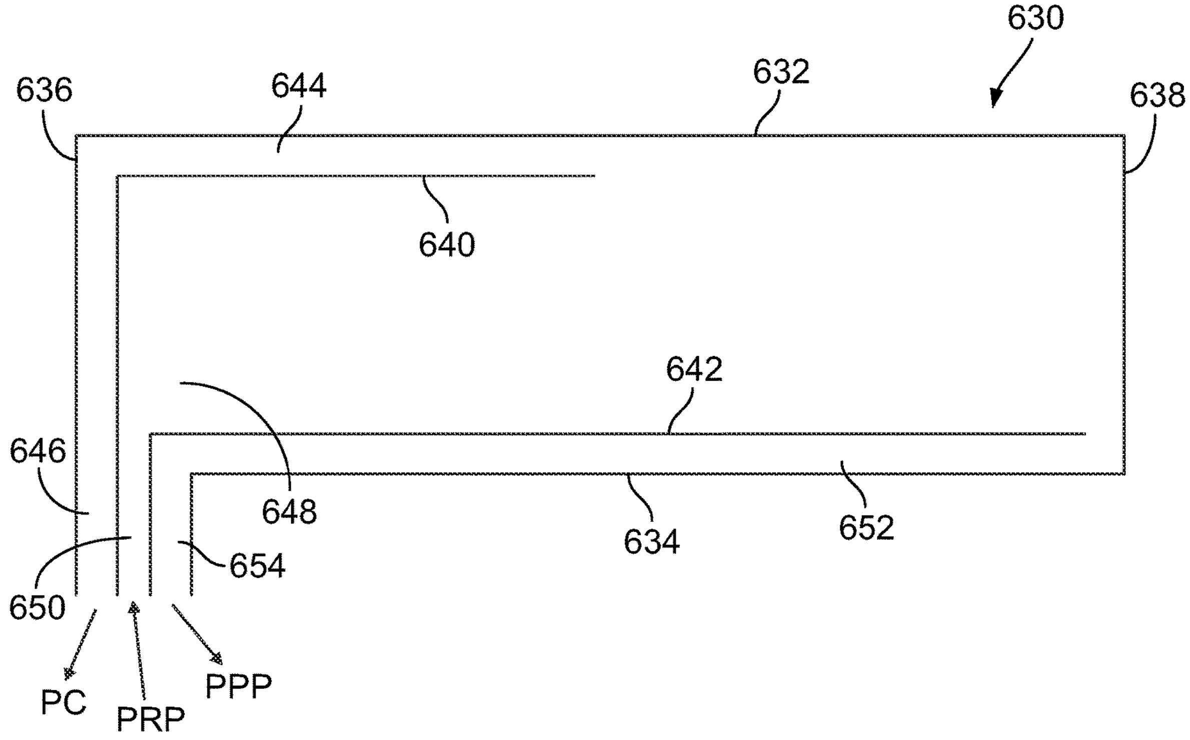
FIG. 19 is a plan view of a flexible fluid separation chamber which may be used in combination with a gap of the type illustrated in FIG. 18.

The gap configuration of FIG. 18 includes a first section 624 and a second section 626, with the first section 624 being configured to receive the first stage 628 of a flexible fluid separation chamber and the second section 626 configured to receive the second stage 630 of a flexible fluid separation chamber. An exemplary second stage 630 is shown in greater detail in FIG. 19, while the configuration of a first stage 628 used in combination with the first gap section 624 of FIG. 18 may be similar to that shown in FIGS. 21 and 21A (described in greater detail below) or may otherwise vary without departing from the scope of the present disclosure.

In contrast to the gap defined by the spool and bowl of the centrifuge 10 of FIG. 1, the first and second sections 624 and 626 of the gap or channel of FIG. 18 are separate from each other, rather than defining a continuous gap. For a gap having separate first and second sections, it may be advantageous for the associated fluid separation chamber to be comprised of first and second stages which can be physically separated from each other, rather than a fluid separation chamber of the type shown in FIG. 4, in which the two stages are separate, but adapted for use with a continuous gap.

In the illustrated embodiment of FIG. 19, the fluid separation chamber is provided as a flexible body with a seal defining a second stage 630 with a top edge 632, a bottom edge 634, and a pair of side edges 636 and 638. In addition to the perimeter seal, the second stage 630 includes a first interior wall 640 and a second interior wall 642. The second stage 630 may include additional interior walls or seals without departing from the scope of the present disclosure. In the illustrated embodiment, the two interior seals or walls 640 and 642 extend in a dogleg or L-shaped manner from the bottom edge 634, at a location adjacent to one of the side edges (i.e., the left side edge 636 in the illustrated embodiment), toward the top edge 632. Then the interior walls 640 and 642 extend (in varying degrees) toward one of the side edges (i.e., the right side edge 638 in the illustrated embodiment), without contacting either the top edge 632 or the side edge. It is within the scope of the present disclosure for these interior walls to be otherwise configured without departing from the scope of the present disclosure.

The interior seal lines or walls of the stage 630 help to define fluid passages which allow for fluid communication between the stage 630 and an associated flow circuit. In the illustrated embodiment, a first fluid passage 644 is defined at least in part by the left side edge 636, the top edge 632, and the first interior wall 640 to allow fluid communication between the stage 630 and the associated flow circuit (which may be configured similarly to the one illustrated in FIG. 5 or otherwise configured) via a port 646 extending through the bottom edge 634. A second fluid passage 648 is defined at least in part by the first and second interior walls 640 and 642 to allow fluid communication between the stage 630 and the associated flow circuit via a port 650 extending through the bottom edge 634. A third fluid passage 652 is defined at least in part by the second interior wall 642 and the bottom edge 634 to allow fluid communication between the stage 630 and the associated flow circuit via a port 654 extending through the bottom edge 634.

The degree to which the interior walls extend toward the side edge determines the radial positions of the fluid passages defined by the interior walls. In particular, the second section 626 of the gap of FIG. 18 is arcuate, extending between first and second ends 656 and 658 to receive the stage 630, with the ports positioned adjacent to the first end 656 of the second section 626 and the right side edge 638 of the stage 630 positioned adjacent to the second end 658. The second section 626 of the gap has a radius which varies about a central axis, with minimum radii regions at or adjacent to the first and second ends 656 and 658 (i.e., at approximately the "twelve-o-clock" and "six-o-clock" positions in the illustrated orientation), and a maximum radius region 660 positioned approximately 90° from the ends (i.e., at approximately the "three-o-clock" position in the illustrated orientation). In FIG. 18, the second section 626 is generally parabolic when viewed from above such that, when moving in a clockwise direction, the magnitude of the radius about the axis first increases from the minimum radius (at the first end 656) to a maximum radius location 660 (at approximately the "three-o-clock" position in the illustrated orientation), before decreasing again to a minimum radius (at the second end 658).

In the stage 630 shown in FIG. 19, it will be seen that the second interior wall 642 extends closer to the right side edge 638 of the stage 630 than the first interior wall 640. The free end of the second interior wall 642 is relatively close to the right side edge 638 which, when loaded into the second section 626 of a gap as shown in FIG. 18, is positioned at or adjacent to the location of minimum radius (i.e., at or adjacent to the second end 658 of the second section 626). Extending the free end of the second interior wall 642 to a position adjacent to the right side edge 638 effectively places the third fluid passage 652 at the minimum radius location of the second section 626 of the gap. Thus, in the flow configuration of FIGS. 18 and 19, in which the stage 630 is used as a second stage to separate PRP into PC and PPP, the PPP is directed out of the stage 630 (via the third fluid passage 652) at or adjacent to the minimum radius location of the second section 626 of the gap or centrifugation field.

In contrast, the free end of the first interior wall 640 is positioned farther from the right side edge 638. In the illustrated embodiment, the free end of the first interior wall 640 is positioned approximately midway between the left and right side edges 636 and 638 such that, when the stage 630 is loaded into the second section 626 of a gap as illustrated in FIG. 18, it is positioned at or adjacent to the location of maximum radius 660 (i.e., at the "three-o-clock" position in the illustrated orientation of FIG. 18). So positioning the free end of the first interior wall 640 effectively places the first and second flow passages 644 and 648 (when used as a fluid outlet) at or adjacent to the maximum radius location 660 of the second section 626 of the gap. Thus, in the flow configuration of FIGS. 18 and 19, PRP is directed into the stage 630 (via the second fluid passage 648) at or adjacent to the minimum radius location of the second section 626 of the gap (i.e., at or adjacent to the first end 656), while PC is directed out of the stage 630 (via the first fluid passage 644) at a location having a maximum radius.

In an exemplary dual-stage fluid separation procedure, whole blood is flowed into the first stage 628 of a fluid separation chamber received in the first section 624 of a gap in a spinning centrifuge (of the type shown in FIG. 1 or otherwise configured). The whole blood enters the first stage and the centrifugal force or field present in the fluid separation chamber acts upon the blood to separate it into a layer substantially comprised of platelet-rich plasma and a layer substantially comprised of red blood cells. The higher density component (red blood cells) sediments toward the high-G wall 662, while the lower density component (platelet-rich plasma) remains closer to the low-G wall 664. The red blood cells are flowed out of the first stage 628, where they are either harvested or returned to the blood source. The platelet-rich plasma is flowed from the first stage into the second stage 630, which is positioned in the second section 626 of the gap or centrifugation field.

In the flow configuration of FIG. 19, the platelet-rich plasma enters the second stage 630 via port 650 and the second fluid passage 648. The centrifugal field acts upon the platelet-rich plasma to separate it into a layer substantially comprised of platelet concentrate and a layer substantially comprised of platelet-poor plasma. The higher density component (platelets) sediments toward the high-G wall 666, while the lower density component (platelet-poor plasma) remains closer to the low-G wall 668. The platelet concentrate is flowed out of the second stage 630 via port 646 and the first fluid passage 644, where it is either harvested or returned to the blood source. The platelet-poor plasma is flowed out of the second stage 630 via port 654 and the third fluid passage 652, where it is either harvested or returned to the blood source.

The similarity between the rigid chambers 500 and 600 of FIGS. 16 and 17 and the flexible stage 630 of FIG. 19 can be seen in that, in each case, platelet-rich plasma enters into the gap/channel at or adjacent to a minimum radius location and is separated into platelet concentrate and platelet-poor plasma, with the platelet concentrate moving toward a region of maximum radius in the gap/channel and the platelet-poor plasma moving toward a region of minimum radius in the gap/channel for removal from the stage.

FIGS. 20-25 illustrate additional embodiments of flexible, semi-flexible, or otherwise non-rigid fluid separation chambers and associated fixtures which provide fluid processing functionality comparable to that of the rigid fluid separation chambers of FIGS. 11-17.

Figure 20:
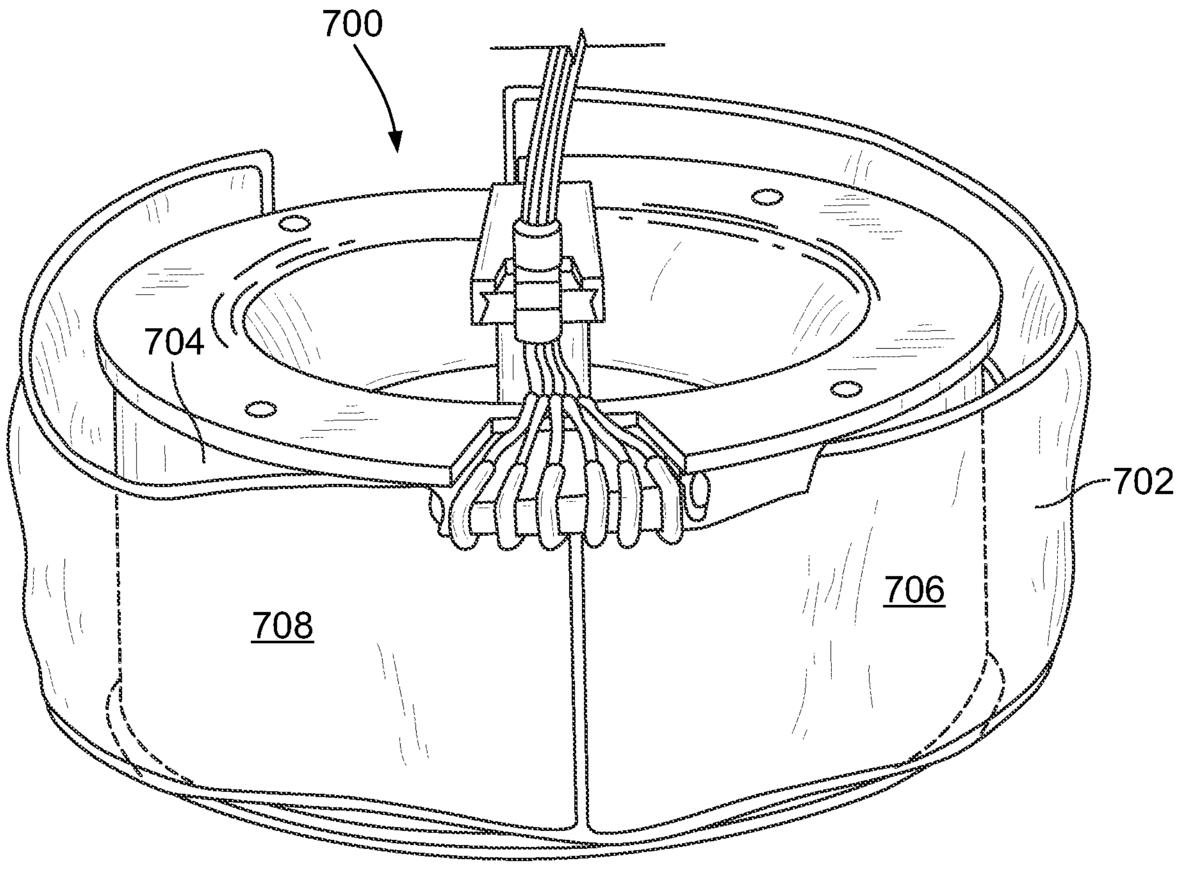
FIG. 20 shows an alternative spool of the centrifuge of FIG. 1, with a fluid separation chamber wrapped about it for use.

FIG. 20 shows an alternative embodiment of a spool 700 and a flexible fluid separation chamber 702 suitable for use with the spool 700. Similar to the flexible chamber 14 of FIG. 2, the fluid separation chamber 702 is carried within a rotating assembly, specifically within a gap or channel defined in a centrifuge, such as between a rotating spool 700 and bowl of the centrifuge. Of course, the gap or channel may be provided in any suitable structure and does not specifically require a bowl or spool arrangement.

In the illustrated embodiment, as in the embodiment of FIGS. 1-4, the centrifuge includes a bowl with an interior wall that defines the high-G wall of a centrifugal field during use of the centrifuge, while the exterior spool wall 704 defines the low-G wall of the centrifugal field. In the embodiment of FIGS. 1-4, the gap or centrifugal field defined between the spool 20 and the bowl 22 is substantially annular, with a uniform distance between the high- and low-G walls 24 and 26, and with the high- and low-G walls 24 and 26 each having substantially uniform diameters. In contrast, and as will be described in greater detail herein, the spool 700 of FIG. 20 has an outer surface with a non-uniform outer to define the low-G wall 704 of a centrifugal field. By such a configuration, the spool 700 of FIG. 20 provides a gap or centrifugal field that is not a uniform annulus, but instead has a varying inner diameter and may have a varying distance between the high- and low-G walls of the centrifugal field.

Figure 21:
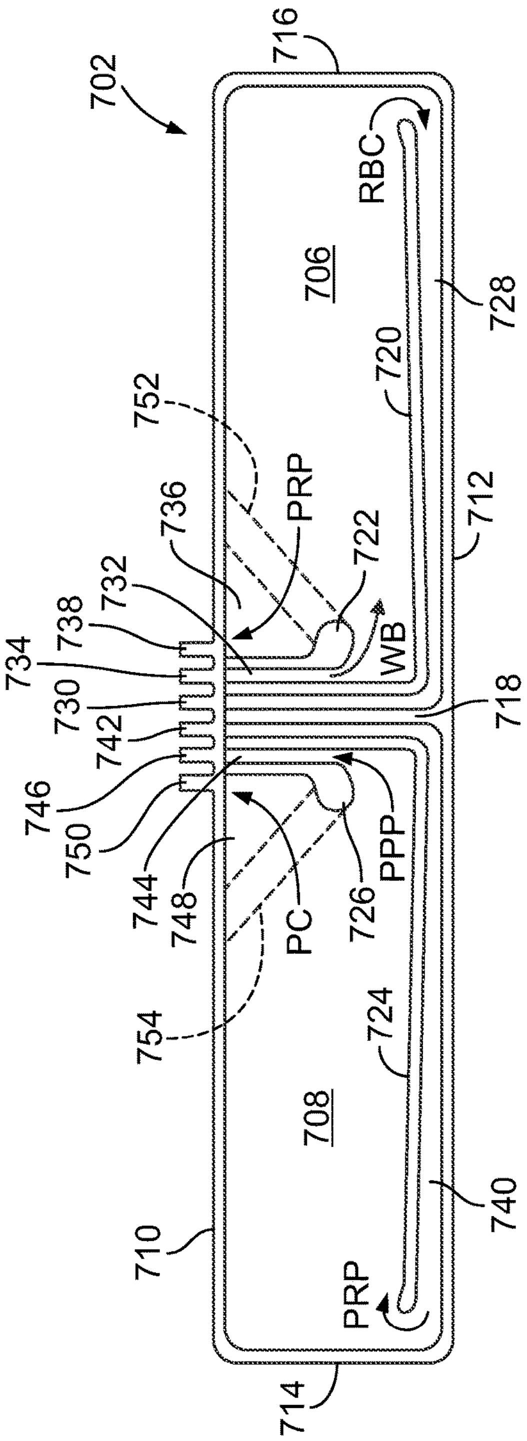
FIG. 21 is a plan view of the fluid separation chamber shown in FIG. 20, showing one fluid flow configuration.
Figure 21A:
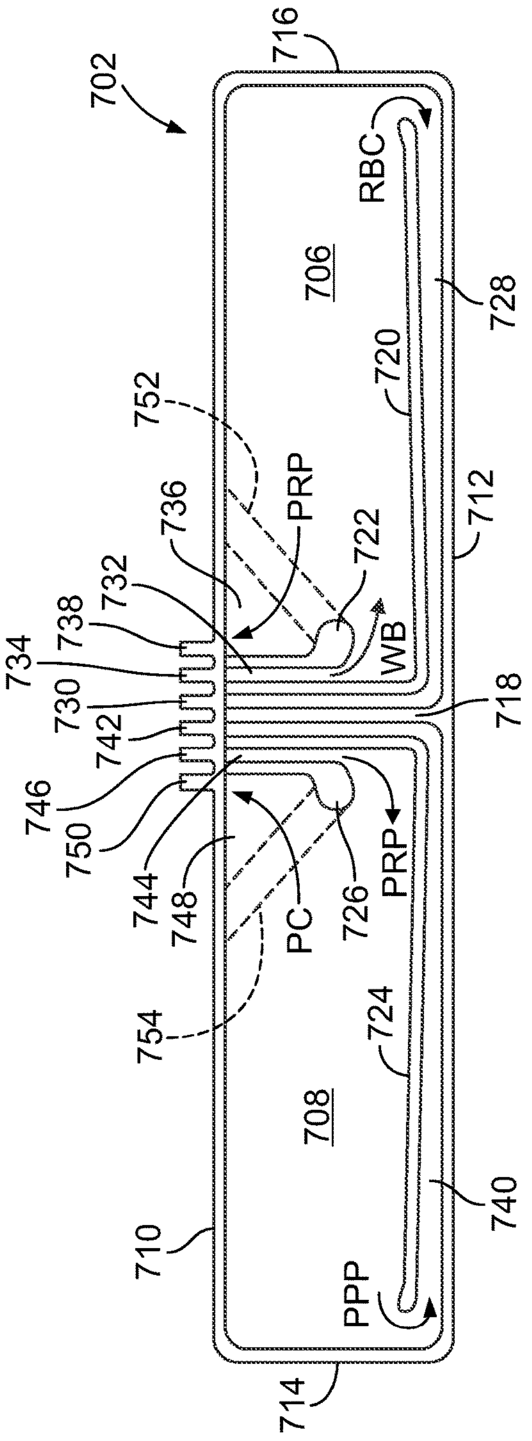
FIG. 21A is a plan view of the fluid separation chamber shown in FIG. 20, showing an alternative fluid flow configuration.

The fluid separation chamber 702 is shown in greater detail in FIGS. 21 and 21A. In the illustrated embodiment, the fluid separation chamber 702 is provided with a plurality of stages or sub-chambers, such as a first stage or sub-chamber or compartment 706 and a second stage or sub-chamber or compartment 708. FIG. 21 shows one configuration of fluid flow through the fluid separation chamber 702, while FIG. 21A showing an alternative configuration of fluid flow through the fluid separation chamber 702, although it should be understood that other flow configurations are also possible. As in other embodiments described herein (e.g., the embodiment of FIG. 8), the second stage 708 includes three fluid communication ports which, during an exemplary blood separation procedure, allow platelet concentrate to be separated from platelet-rich plasma in the second stage 708 and removed therefrom, rather than accumulating in the second stage and being removed at the end of the separation procedure. Automated removal of the platelets may be preferable to platelet accumulation in the second stage as it avoids manual manipulation of the second stage and the associated risk of platelet activation. Automated platelet removal may also decrease the total blood separation procedure time.

In the illustrated embodiment of FIGS. 21 and 21A, the fluid separation chamber 702 is provided as a flexible body with a seal extending around its perimeter to define a top edge 710, a bottom edge 712, and a pair of side edges 714 and 716. A first interior seal or wall 718 extends from the top edge 710 to the bottom edge 712 to divide the interior of the fluid separation chamber 702 into first and second stages 706 and 708. In the embodiment of FIGS. 21 and 21A, the first and second stages 706 and 708 are illustrated as substantial mirror-images, but other configurations may be employed without departing from the scope of the present disclosure.

In addition to the first interior wall 718, the fluid separation chamber 702 may include additional interior walls or seals. In the illustrated embodiment of FIGS. 21 and 21A, the first stage 706 includes two interior seals or walls 720 and 722, which are referred to herein as second and third interior walls, respectively. The second stage 708 may also include two interior seals or walls 724 and 726, which are referred to herein as the fourth and fifth interior walls. In the embodiment of FIGS. 21 and 21A, each interior wall extends in a dogleg or L-shaped manner from the top edge 710 toward the bottom edge 712 and then (in varying degrees) toward one of the side edges (i.e., the right side edge 716 in the case of the second and third interior walls 720 and 722, and the left side edge 714 in the case of the fourth and fifth interior walls 724 and 726), without contacting either the bottom edge 712 or the side edge. It is within the scope of the present disclosure for these interior walls to be otherwise configured without departing from the scope of the present disclosure. Further, it is within the scope of the present disclosure for the fluid separation chamber to include more or fewer than five interior walls or seals.

The interior seal lines or walls of the fluid separation chamber 702 help to define fluid passages which allow for fluid communication between the associated flow circuit (which may be configured similarly to the flow circuit 16 of FIG. 5) and the first and second stages 706 and 708. In the embodiment of FIGS. 21 and 21A, a first fluid passage 728 is defined at least in part by the first and second interior walls 718 and 720 to allow fluid communication between the first stage 706 and the flow circuit via a port 730 extending through the top edge 710. In different flow configurations, the first fluid passage 728 may serve as a fluid inlet or a fluid outlet or both but, in the exemplary blood flow configurations shown in FIGS. 21 and 21A, the first fluid passage 728 provides an outlet for red blood cells flowing out of the first stage 706, as will be described in greater detail herein.

A second fluid passage 732 is defined at least in part by the second and third interior walls 720 and 722 to allow fluid communication between the first stage 706 and the flow circuit via a port 734 extending through the top edge 710. In different flow configurations, the second fluid passage 732 may serve as a fluid inlet or a fluid outlet or both but, in the exemplary blood flow configurations shown in FIGS. 21 and 21A, the second fluid passage 732 provides an inlet for whole blood flowing into the first stage 706, as will be described in greater detail herein.

A third fluid passage 736 is defined at least in part by the third interior wall 722 and the top edge 710 to allow fluid communication between the first stage 706 and the flow circuit via a port 738 extending through the top edge 710. In different flow configurations, the third fluid passage 736 may serve as a fluid inlet or a fluid outlet or both but, in the exemplary blood flow configurations shown in FIGS. 21 and 21A, the third fluid passage 736 provides an outlet for platelet-rich plasma flowing out of the first stage 706, as will be described in greater detail herein.

A fourth fluid passage 740 is defined at least in part by the first and fourth interior walls 718 and 724 to allow fluid communication between the second stage 708 and the flow circuit via a port 742 extending through the top edge 710. In different flow configurations, the fourth fluid passage 740 may serve as a fluid inlet or a fluid outlet or both but, in the exemplary blood flow configurations shown in FIGS. 21 and 21A, the fourth fluid passage 740 provides either an inlet for platelet-rich plasma flowing into the second stage 708 (FIG. 21) or an outlet for platelet-poor plasma flowing out of the second stage 708 (FIG. 21A), as will be described in greater detail herein.

A fifth fluid passage 744 is defined at least in part by the fourth and fifth interior walls 724 and 726 to allow fluid communication between the second stage 708 and the flow circuit via a port 746 extending through the top edge 710. In different flow configurations, the fifth fluid passage 744 may serve as a fluid inlet or a fluid outlet or both but, in the exemplary blood flow configurations shown in FIGS. 21 and 21A, the fifth fluid passage 744 provides either an outlet for platelet-poor plasma flowing out of the second stage 708 (FIG. 21) or an inlet for platelet-rich plasma flowing into the second stage 708 (FIG. 21A), as will be described in greater detail herein.

A sixth fluid passage 748 is defined at least in part by the fifth interior wall 726 and the top edge 710 to allow fluid communication between the second stage 708 and the flow circuit via a port 750 extending through the top edge 710. In different flow configurations, the sixth fluid passage 748 may serve as a fluid inlet or a fluid outlet or both but, in the exemplary blood flow configurations shown in FIGS. 21 and 21A, the sixth fluid passage 748 provides an outlet for platelets flowing out of the second stage 708, as will be described in greater detail herein.

FIGS. 21 and 21A show the ports associated with the top edge 710, with the orientation of the fluid separation chamber 702 being reversed when the centrifuge is in an operational condition (as in FIG. 1) to orient the ports to face downwardly during use. In other embodiments, the ports may instead be associated with the bottom edge 712 instead of the top edge 710 and it is also within the scope of the present disclosure for the ports to be associated with different locations or edges (e.g., one or more of the ports of the first stage 706 associated with the right side edge 716 and/or one or more of the ports of the second stage 708 associated with the left side edge 714) instead of the same edge. Exemplary uses for each of the fluid passages during a fluid separation procedure will be described in greater detail below.

The fluid separation chamber 702 may be used for either single- or multi-stage processing. When used for single-stage processing, a fluid is flowed into one of the stages (typically the first stage 706), where it is separated into at least two components. All or a portion of one or both of the components may then be flowed out of the first stage 706 and harvested or returned to the fluid source. When used for multi-stage processing, a fluid is flowed into the first stage 706 and separated into at least a first component and a second component. At least a portion of one of the components may then be flowed into the second stage 708, where it is further separated into at least two sub-components. The component not flowed into the second stage 708 may be flowed out of the first stage 706 and harvested or returned to the fluid source. As for the sub-components, at least a portion of one or both may be flowed out of the second stage 708 for harvesting or return to the fluid source.

In an exemplary multi-stage fluid processing application, the fluid separation chamber 702 is used to separate whole blood (identified as "WB" in FIGS. 21 and 21A) into platelet-rich plasma (identified as "PRP" in FIGS. 21 and 21A) and red blood cells (identified as "RBC" in FIGS. 21 and 21A) in the first stage 706. The platelet-rich plasma is then flowed into the second stage 708, where it is separated into platelet concentrate (identified as "PC" in FIGS. 21 and 21A) and platelet-poor plasma (identified as "PPP" in FIGS. 21 and 21A).

In the exemplary procedure, whole blood is flowed into the first stage 706 of a fluid separation chamber 702 received in a spinning centrifuge (as in FIG. 1). The whole blood enters the first stage 706 via port 734 and the second fluid passage 732. The centrifugal force or field present in the fluid separation chamber 702 acts upon the blood to separate it into a layer substantially comprised of platelet-rich plasma and a layer substantially comprised of red blood cells. The higher density component (red blood cells) sediments toward the high-G wall of the centrifuge, while the lower density component (platelet-rich plasma) remains closer to the low-G wall 704. The red blood cells are flowed out of the first stage 706 via port 730 and the first fluid passage 728, where they are either harvested or returned to the blood source. The platelet-rich plasma is flowed out of the first stage 706 via port 738 and the third fluid passage 736. The high-G wall may include a first projection or dam 752 which extends toward the low-G wall 704, across the third fluid passage 736. The first dam 752 is configured to intercept red blood cells adjacent thereto and substantially prevent them from entering the third fluid passage 736 and thereby contaminating the platelet-rich plasma.

The platelet-rich plasma flowed out of the first stage 706 is directed into the second stage 708 by operation of one or more of the cassettes of the flow circuit (as in FIG. 5). In the flow configuration of FIG. 21, the platelet-rich plasma enters the second stage 708 via port 742 and the fourth fluid passage 740. The centrifugal field acts upon the platelet-rich plasma to separate it into a layer substantially comprised of platelet concentrate and a layer substantially comprised of platelet-poor plasma. The higher density component (platelets) sediments toward the high-G wall, while the lower density component (platelet-poor plasma) remains closer to the low-G wall 704. The platelet concentrate is flowed out of the second stage 708 via port 750 and the sixth fluid passage 748, where it is either harvested or returned to the blood source. The platelet-poor plasma is flowed out of the second stage 708 via port 746 and the fifth fluid passage 744, where it is either harvested or returned to the blood source. The low-G wall 704 may include a second projection or dam 754 which extends toward the high-G wall, across the sixth fluid passage 748. The second dam 754 is configured to intercept platelet-poor plasma adjacent thereto and substantially prevent it from entering the sixth fluid passage 748 and thereby diluting the platelet concentrate.

In an alternative flow configuration (FIG. 21A), rather than flowing into the second stage 708 via port 742 and the fourth fluid passage 740, the platelet-rich plasma flows into the second stage 708 via port 746 and the fifth fluid passage 744. As described above, the centrifugal field acts upon the platelet-rich plasma in the second stage 708 to separate it into platelet concentrate and platelet-poor plasma. The platelet concentrate is flowed out of the second stage 708 via port 750 and the sixth fluid passage 748, where it is either harvested or returned to the blood source. The platelet-poor plasma is flowed out of the second stage 708 via port 742 and the fourth fluid passage 740, where it is either harvested or returned to the blood source.

Figure 22:
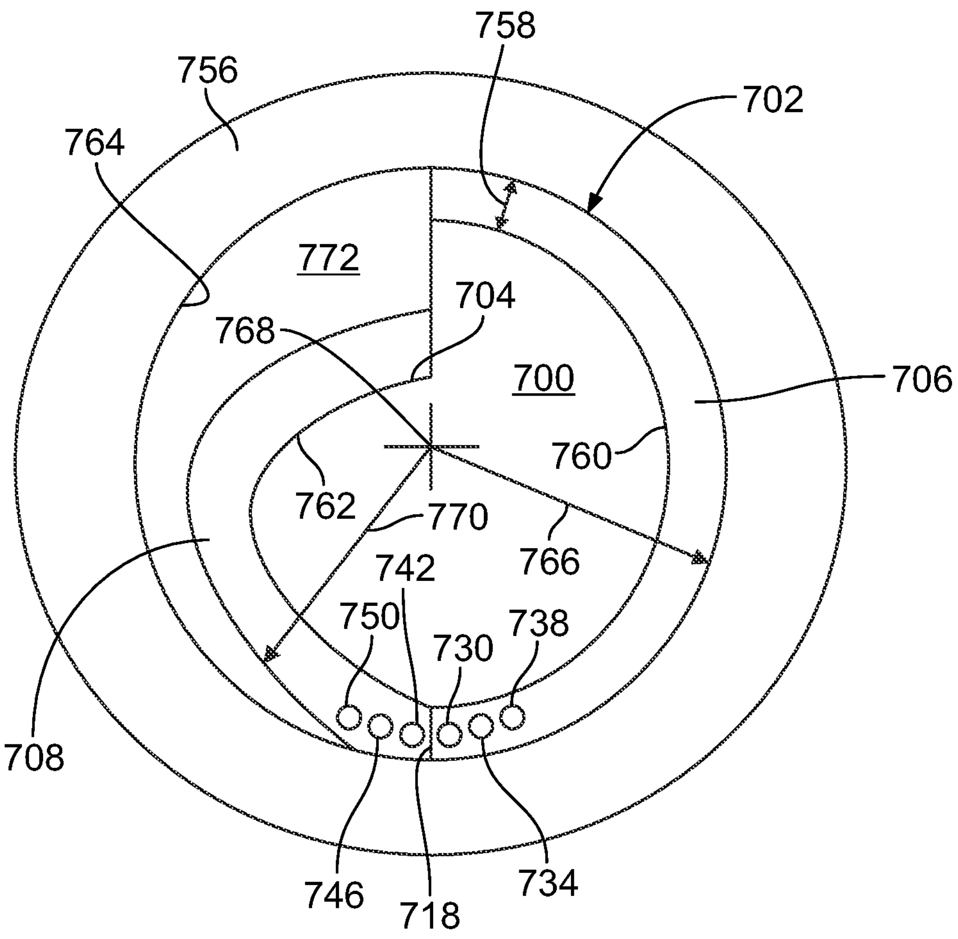
FIG. 22 is a top plan view of the spool, bowl, and fluid separation chamber of FIG. 20.

The fluid separation chamber 702 may be employed in combination with a centrifuge in which the low-G wall, the high-G wall, and/or the gap defined therebetween has a non-uniform radius about the rotational axis. For example, FIG. 22 shows a top view of the spool 700 of FIG. 20 and an associated bowl 756 which combine to define a gap 758 in which a fluid separation chamber may be received. The fluid separation chamber may be variously configured, although it may be preferred to employ a fluid separation chamber 702 of the type shown in FIGS. 21 and 21A.

The channel or gap 758 of FIG. 22 is comprised of an arcuate first section 760 and an arcuate second section 762. The first section 760 receives at least a portion of the first stage 706 of a fluid separation chamber 702, while the second section 762 receives at least a portion of the second stage 708 of the fluid separation chamber 702. Preferably, the first stage 706 is substantially entirely received within the first section 760 of the gap 758 and the second stage 708 is substantially entirely received within the second section 762 of the gap 758, with the first interior wall 718 of the fluid separation chamber 702 substantially aligned with the interface or dividing line between the first and second sections 760 and 762 of the gap 758. In the illustrated embodiment, the first section 760 and the second section 762 each comprise one half of the gap or channel 758 (i.e., 180°, if the gap or channel 758 extends through a 360° arc), although the sections 760 and 762 may alternatively be provided with different arcuate extents.

In the embodiment of FIG. 22, the first section 760 has a radially outer wall, e.g., the bowl inner wall, or high-G wall 764 having a substantially uniform radius 766 about the rotational axis 768, although it may instead be provided with a varying radius. At least a portion of the first section 760 of the gap 758 has an outer radius 766 about the axis 768 which is different from a radius 770 of at least a portion of the surface defining the high-G wall of the second section 762 of the gap 758. For example, as shown in FIG. 22, the second section 762 may have a radius 770 which is smaller in at least one area than the radius 766 of the first section 760. In the illustrated embodiment, the radius 770 of the second section 762 varies about the axis 768, with a maximum radius at or adjacent to the interface or dividing line of the first and second sections 760 and 762 and a smaller radius at all other points. In FIG. 22, the radius 770 of the second section 762 is generally parabolic when viewed from above such that, when moving in a clockwise direction, the magnitude of the radius 770 about the axis 768 first decreases from the maximum radius (at the "six-o-clock" position of FIG. 6) and then increases, before decreasing again to a minimum radius (at the "twelve-o-clock" position of FIG. 22). Other configurations of the second section 762 of the gap 758, such as an inward spiral in which the radius 770 decreases (either gradually or otherwise) when moving in a clockwise (for orientation purposes) direction, may also be employed without departing from the scope of the present disclosure and will be described in greater detail herein.

There are many benefits of employing a gap 758 having a non-uniform radius about the axis 768. For example, such a design allows the various ports and fluid passages to be effectively positioned at different radial positions. In the fluid separation chamber 702 shown in FIG. 21 and FIG. 21A, it will be seen that the fourth interior wall 724 extends closer to the left side edge 714 of the fluid separation chamber 702 than the fifth interior wall 726. The free end of the fourth interior wall 724 is relatively close to the left side edge 714 which, when loaded into the second section 762 of a gap 758 as shown in FIG. 22, is positioned at or adjacent to the location of minimum radius (i.e., at the "twelve-o-clock" position in the illustrated orientation). Extending the free end of the fourth interior wall 740 to a position adjacent to the left side edge 714 effectively places the fourth fluid passage 740 at the minimum radius location of the second section 762 of the gap 758. Thus, in the flow configuration of FIG. 21A, the PPP is directed out of the second stage 708 (via the fourth fluid passage 740) at the minimum radius location of the second section 762 of the gap 758.

In contrast, the free end of the illustrated fifth interior wall 726 is positioned much closer to the first interior wall 718 which, when the fluid separation chamber 702 is loaded into the second section 762 of a gap 758 as illustrated in FIG. 22, is positioned at or adjacent to the location of maximum radius (i.e., at the "six-o-clock" position in the illustrated orientation of FIG. 22). Positioning the free end of the fifth interior wall 726 adjacent to the first interior wall 718 effectively places the fifth and sixth flow passages 744 and 748 at or adjacent to the maximum radius location of the second section 762 of the gap 758. Thus, in the flow configuration of FIG. 21A, the PRP is directed into the second stage 708 (via the fifth fluid passage 744) at the maximum radius location of the second section 762 of the gap 758, while the PC is directed out of the second stage 708 (via the sixth fluid passage 748) at a location having an intermediate radius. It will be appreciated that such a flow configuration is similar to that experienced by the fluid components in the stages of the rigid chambers shown in FIGS. 11 and 13-14.

In the embodiment of FIGS. 21 and 21A, the free end of the fifth interior wall 726 is positioned relatively close to the first interior wall 718 such that, when used in combination with a gap 758 as illustrated in FIG. 22, the sixth fluid passage 748 will be positioned at a relatively high radius location, but the radial position of the sixth fluid passage 748 may vary depending on the degree to which the free end of the fifth interior wall 726 extends toward the left side edge 714. For example, if it were desirable for the sixth fluid passage 748 to be effectively positioned at a region having a lower radius when used in combination with a gap 758 as illustrated in FIG. 22, the free end of the fifth interior wall 726 could be positioned closer to the left side edge 714 because the radius 770 of the second stage 708 is at a minimum at the left side edge 714 when inserted into a varying radius second section 762 of a gap 758 as illustrated in FIG. 22.

When the second stage 708 of a fluid separation chamber 702 is received in a region of the gap 758 having a high-G wall with a non-uniform radius about the axis, at least a portion of the heavier fluid component (e.g., platelets in a blood separation procedure) will flow against or along the varying-radius wall. The heavier fluid component moves "down" the surface of the high-G wall toward a region of maximum radius from the axis 768. In the embodiment of FIG. 22, this means that the heavier fluid component will "slide" along the high-G wall toward the associated outlet port (i.e. port 750 in the flow configurations of FIG. 21A), which is positioned at or adjacent to the maximum radius of the second section 762 of the gap 758. Hence, when used for blood separation, the varying radius 770 of the second section 762 of the gap 758 serves to encourage the flow of platelets out of the second stage 708.

A gap 758 having a non-uniform radius about the axis 768 may be defined in any of a number of ways. For example, the outer wall 704 of the spool 700 (low-G wall) and the inner wall 764 of the bowl 756 (high-G wall) may be shaped or contoured so as to define the gap 758. In another embodiment, one or more inserts may be associated with the spool 700 and/or the bowl 756 to define a gap 758 having a non-uniform radius about the axis 768. FIG. 22 illustrates an insert 772 associated with a portion of the inner wall 764 of the bowl 756 to define a portion of the gap 758 having a non-uniform radius about the axis 768. Regardless of how the centrifuge is configured to define the channel or gap 758, it may be advantageous to balance the weight of the centrifuge about the axis 758 to avoid damage or wear to the centrifuge during use.

Figure 23:
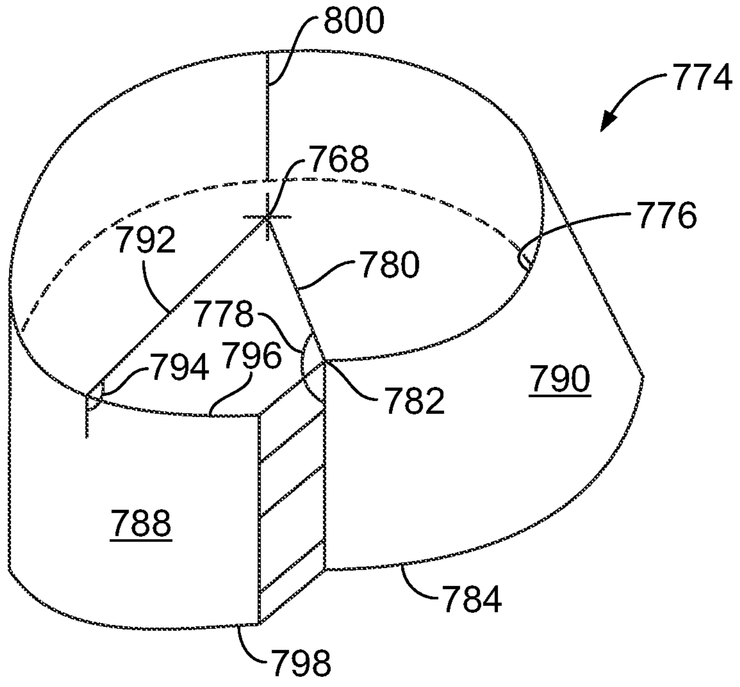
FIG. 23 is a perspective view of an alternative centrifuge bowl suitable for use in combination with the fluid flow configuration of FIG. 21A.

In addition to (or instead of) a channel or gap or high-G wall having a non-uniform radius about the axis 768, the gap or high-G wall may be provided with a radius which varies along its axial height. FIG. 23 shows an alternative bowl 774 which may be used in combination with the spool 700 of FIG. 22 or with a spool having an outer wall with a uniform radius about the rotational axis 768. At least a portion of the bowl 774 has an inner wall 776 with a radius at one height along the axis 768 which is different from the radius at another height. In the illustrated embodiment, the angle 778 between a radius 780 of a portion of the bowl inner wall 776 and the surface of the inner wall 776 is greater than 90°. Thus, if the surface of the inner wall 776 is generally planar in that portion, the radius 780 at the top 782 of the inner wall 776 will be less than the radius at the bottom 784 of the inner wall 776 in this area, as shown on the right side of FIG. 24. In an alternative embodiment, an insert may be associated with the bowl inner wall 776 to provide a high-G wall with a radius which varies along its axial height. Regardless of how the centrifuge is configured to define the high-G wall, it may be advantageous to balance the weight of the centrifuge about the axis 768 to avoid damage or wear to the centrifuge during use.

Figure 24:
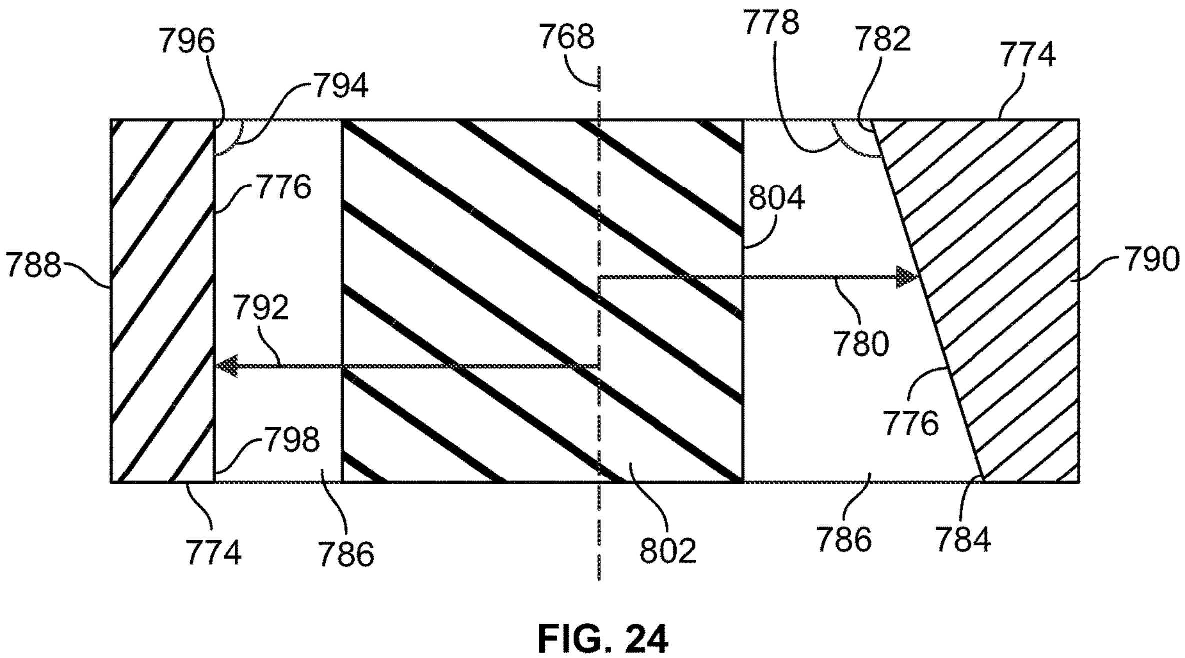
FIG. 24 is a cross-sectional side view of a centrifuge spool and bowl suitable for use in combination with the fluid separation chamber of FIG. 21A.

The bowl inner wall 776 (and/or an insert associated therewith, if provided) serves as the high-G wall of the gap 786, and providing it with a radius which varies along its axial height may provide an additional flow rate-varying feature. The cross-sectional area of the gap is defined in part by the low- and high-G walls. Thus, if the radius of one of the walls varies along its axial height while the radius of the other stays relatively constant or uniform along its axial height (and assuming no variation in the position of the top and/or bottom surfaces of the gap), then the cross-sectional area of a top portion of the gap may be different from the cross-sectional area of a bottom portion of the gap. Similarly, the cross-sectional area of a radially outer portion of the gap may be different from the cross-sectional area of a radially inner portion of the gap. The right side of FIG. 24 shows such a gap configuration, with the top portion of the gap 786 having a smaller cross-sectional area than the bottom portion thereof, and the radially outer portion (i.e., the portion of the gap 786 adjacent to the bowl inner wall 776) having a smaller cross-sectional area than the radially inner portion (i.e., the portion of the gap 776 adjacent to the low-G wall). If one fluid component can be directed into a gap portion having a relatively large cross-sectional area and another fluid component can be directed into a gap portion having a relatively small cross-sectional area, the relative flow rates of the two fluid components will be different. In particular, the flow rate of the fluid component in the gap portion of smaller cross-sectional area will have a greater flow rate than that of the fluid component in the gap portion having a larger cross-sectional area. Depending on the nature of the fluid to be separated, these flow rate differentials may be advantageous in terms of component separation and anti-contamination measures. For example, if PRP is being separated into PPP and PC, it may be advantageous for the PC to flow at a greater rate than the PPP (as in the flow configuration of the stage 402' of the rigid chamber 400' of FIGS. 13 and 14) to lift the platelets away from the plasma, thereby ensuring that the plasma remains platelet-free while fluidizing the platelets. To execute such a flow arrangement in the gap configuration of FIG. 24, the platelet outlet region or flow path may be positioned at a greater axial height (i.e., in an upper portion of the gap), with the plasma outlet region or flow path being positioned at a lesser axial height (i.e., in a lower portion of the gap). Alternatively a similar effect could be achieved by positioning the platelet outlet region or flow path at a radially outer position and the plasma outlet region or flow path at a radially inner position. Other gap configurations may be employed to create such a flow differential, so the embodiments of FIGS. 23 and 24 should be understood as being exemplary, rather than exhaustive.

In addition to providing a flow rate-varying feature, providing a high-G wall with a non-uniform radius along its axial height also provides a flow-directing feature, which may be particularly advantageous when the gap is used to separate PRP into PPP and PC. When the second stage of a fluid separation chamber is received in a region of the gap 786 having a high-G wall with a non-uniform radius along its axial height, at least a portion of the heavier fluid component (e.g., platelets in a blood separation procedure) will flow against or along the varying-radius wall. The heavier fluid component moves "down" the surface of the illustrated high-G wall 776 toward a region of maximum radius from the axis 768. In the embodiment of FIGS. 23 and 24, this means that the heavier fluid component will "slide" along the high-G wall 776 toward the associated outlet port, which is positioned at the maximum radius of the gap 786 (i.e., at or adjacent to the bottom 784 of the high-G wall 776). Hence, when used for blood separation, the varying radius 780 of the high-G wall 776 along its axial height serves to encourage the flow of platelets out of the second stage. Such a configuration of the high-G wall may be particularly advantageous to employ in combination with the flow configuration of FIG. 21A to ensure proper sedimentation and flow of platelets to the proper outlet port.

The entire bowl inner wall may have a radius which varies along its axial height, but it is also within the scope of the present disclosure for only a portion of the bowl inner wall (high-G wall) to be so configured. FIG. 23, for example shows a bowl 774 having a first section 788 and a second section 790. The second section 790 is configured as described above, with an inner wall 776 having a radius which varies along its axial height. In the first section 788 of FIG. 23, the inner wall 776 has a radius 792 which is substantially uniform along its axial height. Stated differently, the angle 794 between a radius 792 of the first section 788 of the bowl inner wall 776 and the surface of the inner wall 776 is 90° such that, if the surface of the inner wall 776 is generally planar in the first section 788, the radius at the top 796 of the inner wall 776 will be equal to the radius at the bottom 798 of the inner wall 776, as shown on the left side of FIG. 24. The first section 788 is configured to surround (i.e., be positioned radially outward of) at least a portion of the first stage of a fluid separation chamber, while the second section 790 is configured to surround or be positioned radially outwardly of at least a portion of the second stage of the fluid separation chamber. Preferably, the first stage is substantially entirely encircled by the first section 788 of the bowl inner wall 776 and the second stage is substantially entirely encircled by the second section 790 of the bowl inner wall 776, with the division between the stages of the fluid separation chamber substantially aligned with the interface or dividing line 800 between the first and second sections 788 and 790 (FIG. 23). In one embodiment, the first section 788 and the second section 790 each comprise one half or 180° of the bowl 774, although the sections 788 and 790 may alternatively be provided with different annular or arcuate extents.

The cross-sectional view of FIG. 24 shows a bowl 774 in combination with a spool 802 having an outer wall 804 with a radius which, in the vicinity of the varying-radius portion of the bowl 774 (i.e., the right side of FIG. 24), is substantially uniform along its axial height. FIG. 24 shows the bowl inner wall 776 with a linear or planar configuration, but other configurations in which the radius along the axis 768 varies (e.g., a configuration in which the wall 776 is curved in the cross-sectional view of FIG. 24) may also be employed without departing from the scope of the present disclosure. For the reasons described above, it may be advantageous for the second stage to have a varying or non-uniform cross-sectional area, either as shown in the FIG. 24 or as may be achieved by any of a number of other ways (e.g., by otherwise varying the height and/or width of the stage). For example, if it would be advantageous for fluid flow velocity to be higher in a lower gap portion than in a higher gap portion, the inclination of the high-G wall 776 may be reversed from top to bottom, such that the cross-sectional area of the bottom portion of the gap 786 is less than the cross-sectional area of the top portion, resulting in a greater fluid velocity in the lower portion. The same variable-area configuration may also be employed for the section of the gap 786 receiving the first stage.

Figure 25:
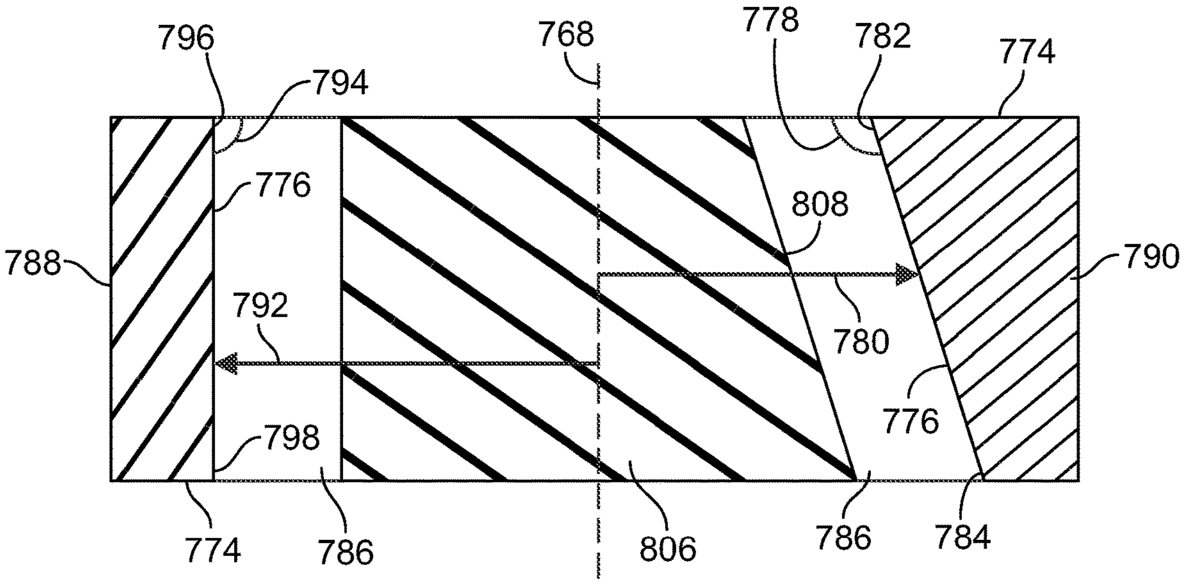
FIG. 25 is a cross-sectional side view of an alternative centrifuge spool and bowl suitable for use in combination with the fluid separation chamber of FIG. 21A.

Other spool configurations may also be employed without departing from the scope of the present disclosure. For example, FIG. 25 shows the bowl 774 in combination with a spool 806 having an outer wall 808 with a radius (at least in the vicinity of the varying-radius portion of the bowl 774) which varies along its axial height, similar to the configuration of the bowl inner wall 776. The varying radius of the spool wall 808 may be inclined at an angle substantially the same as the angle 778 of the bowl inner wall 776, in which case the gap 786 defined therebetween will have a substantially uniform width. While the gap configuration of FIG. 24 would provide both the fluid velocity- and direction-modifying features described above, the gap configuration of FIG. 25 would provide only a flow direction-modifying, on account of the upper and lower portions of the gap and the radially inner and outer portions of the gap having the same approximate cross-sectional areas. This may be preferred if it would be advantageous for the fluid velocity to be substantially the same in the different portions of the gap. As with the bowl inner wall configuration, the spool wall configuration is not limited to the linear or planar configuration shown in FIG. 25, but may be otherwise configured (e.g., a configuration in which the wall 808 is curved in the cross-sectional view of FIG. 25) without departing from the scope of the present disclosure.

The varying radii illustrated in FIG. 22 (i.e., a varying radius about the axis 768) and FIGS. 23-25 (i.e., a varying radius along the axis 768) may be employed together or separately. For example, FIG. 23 shows a bowl inner wall 776 employing both varying radii. The illustrated first section 788 has a substantially uniform radius 792 about the axis 768 and along its axial height. The illustrated second section 790 has a radius 780 which varies about the axis 768 and along its axial height. By employing the two varying radii, the fluid flow-modifying effects are combined to further ensure proper sedimentation and contamination-free removal of platelets from the second stage of a fluid separation chamber when the centrifuge is used for blood separation.

While the non-rigid chambers described above are illustrated and explained in the context of flexible chambers inserted within a gap between a centrifuge spool and bowl, it is also within the scope of the present disclosure to provide flexible or semi-flexible fluid separation chambers which do not require a spool and bowl arrangement. It is known to use a rigid separator bowl or platen that has a channel or groove into which a separation chamber is received. Examples of such structures may be found in U.S. Pat. Nos. 4,386,730 and 4,708,712, both of which are hereby incorporated herein by reference.

As should be clear from the foregoing, fluid separation chambers according to the present disclosure may be formed as either flexible, rigid, or semi-rigid bodies. Different chamber configurations may be more advantageous for flexible or rigid constructions. For example, due to the illustrated flow configurations, the fluid separation chambers of FIGS. 4 and 6 may be well suited for a flexible construction, while the fluid separation chambers of FIGS. 9-11 may be well suited for a rigid construction. If a fluid separation chamber is formed using a rigid material, it is easier to position the various ports at different radial positions with respect to the axis of rotation, such that the separated fluid components may be directed to the appropriate fluid passage and port without the need for the projections or dams described above.

In addition to being provided as either flexible, rigid, or semi-rigid bodies, fluid separation chambers according to the present disclosure may be formed as the combination of rigid, semi-rigid, and flexible bodies. For example, the first stage processing may be carried out in a first stage defined in a flexible body and then a separated fluid component may be transferred from the flexible body to a second stage defined in a rigid body for further separation. In another example, the first stage processing may be carried out in a first stage defined in a rigid body and then a separated fluid component may be transferred from the rigid body to a second stage defined in a flexible body for further separation.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A centrifuge for rotation about an axis in a fluid processing system to generate a centrifugal field, comprising:

a bowl defining an open interior;

a drive system configured to rotate the bowl about the axis; and an insert at least partially positioned within the interior of the bowl and removable from the bowl, wherein the insert defines at least a portion of a radially outer surface of a non-annular gap configured to receive at least a portion of a fluid separation chamber, the gap includes a first section having a generally uniform radius about the axis and a second section having a non-uniform radius about the axis, and the insert is configured to not come into direct contact with a fluid to be separated within the centrifuge and/or a separated fluid component within the centrifuge.

2. The centrifuge of claim 1, wherein the radius of the second section of the gap about the axis is no larger than the radius of the first section of the gap about the axis.

3. The centrifuge of claim 1, wherein the bowl includes a generally annular wall having a substantially uniform inner radius about the axis.

4. The centrifuge of claim 1, wherein the insert defines at least a portion of the second section of the gap.

5. The centrifuge of claim 1, further comprising a second insert at least partially positioned within the bowl to define a portion of the gap.

6. The centrifuge of claim 1, wherein the bowl is pivotal into and out of coaxial alignment with the axis.

7. The centrifuge of claim 1, wherein the bowl is pivotal into and out of coaxial alignment with the axis, and the insert is configured to be removed from the interior of the bowl when the bowl is out of coaxial alignment with the axis.

8. The centrifuge of claim 1, wherein the insert defines the entire gap.

9. An insert for use in combination with a centrifuge of the type configured for rotation about an axis in a fluid processing system to generate a centrifugal field and including a bowl defining an open interior, the insert comprising a body having a first surface and a second surface, wherein the insert is configured to be at least partially positioned within the interior of the bowl with the second surface positioned radially inwardly of the first surface with respect to the axis to define at least a portion of a radially outer surface of a non-annular gap configured to receive at least a portion of a fluid separation chamber and having a first section with a generally uniform radius about the axis and a second section having a non-uniform radius about the axis, the insert is configured to be removable from the bowl, and the insert is configured to not come into direct contact with a fluid to be separated within the centrifuge and/or a separated fluid component within the centrifuge.

10. The insert of claim 9, wherein the radius about the axis of the second section of the gap at least partially defined by the insert is no larger than the radius about the axis of the first section of the gap.

11. The insert of claim 9, wherein the first surface of the insert is configured to be associated to a radially inner surface of the bowl having a generally uniform radius about the axis.

12. The insert of claim 9, wherein the insert is configured to define at least a portion of the second section of the gap.

13. The insert of claim 9, wherein the insert is configured to define only a portion of the gap.

14. The insert of claim 9, wherein at least a portion of the first surface of the insert is configured to define said at least a portion of the gap.

15. The insert of claim 9, wherein at least a portion of the second surface of the insert is configured to define said at least a portion of the gap.

16. The insert of claim 9, wherein the insert is configured to define the entire gap.

* * * * *